(12) United States Patent
Kang et al.

(10) Patent No.: US 12,363,644 B2
(45) Date of Patent: Jul. 15, 2025

(54) WIRELESS COMMUNICATION SYSTEM SUPPORTING FULL DUPLEX RADIO, AND APPARATUS THEREFOR

(71) Applicant: LG ELECTRONICS INC., Seoul (KR)

(72) Inventors: Daegeun Kang, Seoul (KR); Woochan Kim, Seoul (KR); Jongpil Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 403 days.

(21) Appl. No.: 17/924,804

(22) PCT Filed: May 11, 2020

(86) PCT No.: PCT/KR2020/006159
§ 371 (c)(1),
(2) Date: Nov. 11, 2022

(87) PCT Pub. No.: WO2021/230389
PCT Pub. Date: Nov. 18, 2021

(65) Prior Publication Data
US 2023/0239805 A1    Jul. 27, 2023

(51) Int. Cl.
*H04W 52/24* (2009.01)
*H04L 5/16* (2006.01)
*H04W 52/42* (2009.01)

(52) U.S. Cl.
CPC ............ *H04W 52/241* (2013.01); *H04L 5/16* (2013.01); *H04W 52/42* (2013.01)

(58) Field of Classification Search
None
See application file for complete search history.

(56) References Cited

U.S. PATENT DOCUMENTS

2015/0372743 A1* 12/2015 Khojastepour ...... H04B 7/0634
370/277
2015/0381335 A1    12/2015 Khojastepour et al.
(Continued)

FOREIGN PATENT DOCUMENTS

| KR | 1020160018074 | 2/2016 |
| KR | 1020180116454 | 10/2018 |
| KR | 1020190081421 | 7/2019 |

OTHER PUBLICATIONS

Experiment Driven Classification of Full-Duplex Wireless Systems (Year: 2012).*
(Continued)

*Primary Examiner* — Christopher T Wyllie
(74) *Attorney, Agent, or Firm* — LEE, HONG, DEGERMAN, KANG & WAIMEY

(57) ABSTRACT

The present document relates to a method for transmitting and receiving a signal by a user equipment in a wireless communication system, and discloses the method for transmitting and receiving a signal, comprising the steps of: receiving a first reference signal from a base station; receiving a second reference signal from the base station; measuring power of each of the received first reference signal and the received second reference signal; and comparing the sizes of the measured power of the first reference signal and the measured power of the second reference signal, wherein the first reference signal is received in a half-duplex (HD) transmission mode, the second reference signal is received in a full-duplex (FD) transmission mode, and an FD gain value of the FD transmission mode is changed on the basis of a result of the comparing.

12 Claims, 26 Drawing Sheets

(56) References Cited

U.S. PATENT DOCUMENTS

| | | | | |
|---|---|---|---|---|
| 2016/0036504 A1* | 2/2016 | Khojastepour | ........ | H04B 7/024 |
| | | | | 370/280 |
| 2016/0295596 A1* | 10/2016 | Masmoudi | ............. | H04B 1/525 |
| 2017/0054544 A1* | 2/2017 | Kazmi | ....................... | H04L 5/14 |
| 2017/0332340 A1* | 11/2017 | Noh | ....................... | G01S 5/0289 |
| 2018/0041326 A1* | 2/2018 | Kazmi | ....................... | H04L 5/14 |
| 2018/0254926 A1* | 9/2018 | Kim | .................. | H04L 25/03821 |
| 2018/0255549 A1* | 9/2018 | Langereis | ......... | H04W 72/0446 |
| 2018/0287739 A1* | 10/2018 | Kim | ....................... | H04J 11/0023 |
| 2018/0343104 A1* | 11/2018 | Gurbuz | ............... | H04W 56/001 |
| 2020/0119890 A1* | 4/2020 | Yeh | ........................... | H04L 5/14 |
| 2020/0120722 A1* | 4/2020 | Su | ......................... | H04L 67/131 |
| 2021/0112429 A1* | 4/2021 | Raghavan | ............ | H04B 17/336 |
| 2021/0136771 A1* | 5/2021 | Xu | .................... | H04W 72/0453 |
| 2021/0391972 A1* | 12/2021 | Mun | ....................... | H04L 25/023 |
| 2022/0123810 A1* | 4/2022 | Huang | .................. | H04L 5/0062 |
| 2022/0200777 A1* | 6/2022 | Lee | ....................... | H04L 5/1461 |
| 2022/0417864 A1* | 12/2022 | Abotabl | .............. | H04W 52/243 |
| 2023/0188245 A1* | 6/2023 | Shin | .................. | H04W 56/0045 |
| | | | | 370/277 |
| 2023/0239805 A1* | 7/2023 | Kang | .................. | H04W 52/241 |
| | | | | 370/277 |
| 2025/0055657 A1* | 2/2025 | Abdelghaffar | ............ | H04L 5/14 |

OTHER PUBLICATIONS

Mohammed Al-Imari, "Theoretical analysis of full duplex system with power control", 2016 International Symposium on Wireless Communication Systems, Oct. 20, 2016, 7 pages.

PCT International Application No. PCT/KR2020/006159, International Search Report dated Jan. 26, 2021, 3 pages.

* cited by examiner

FIG. 6
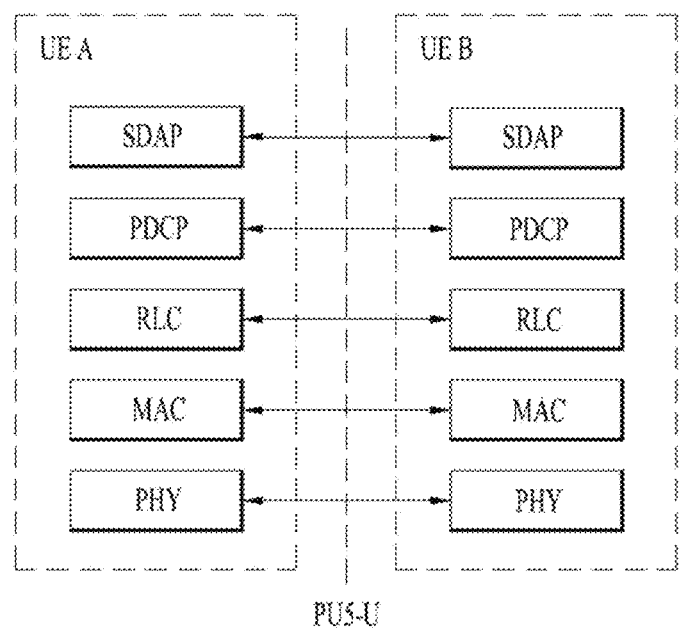
(a)
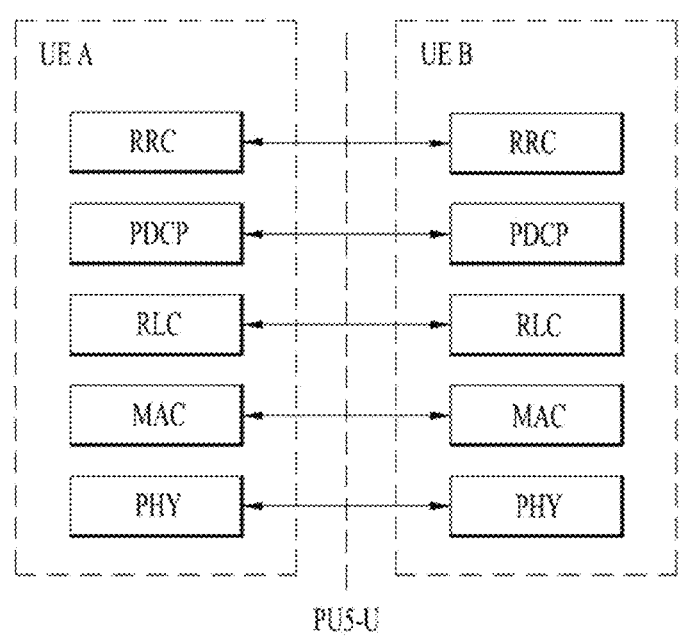
(b)

WIRELESS COMMUNICATION SYSTEM SUPPORTING FULL DUPLEX RADIO, AND APPARATUS THEREFOR

CROSS-REFERENCE TO RELATED APPLICATION

This application is the National Stage filing under 35 U.S.C. 371 of International Application No. PCT/KR2020/006159, filed on May 11, 2020, the contents of which are hereby incorporated by reference herein its entirety.

TECHNICAL FIELD

The present disclosure relates to a method and apparatus for transmitting and receiving data related to full duplex radio (FDR) in a wireless communication system supporting full duplex radio (FDR).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

Also, the UE or vehicle may receive resource allocation for an uplink signal and a resource allocation for a downlink signal from the base station. The UE or vehicle may be allocated resources for the uplink signal from the base station through uplink control information (UCI), or may receive resources for the downlink signal from the base station through uplink control information (DCI).

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

SUMMARY

The problem to be solved is as follows. The self-interference (SI) signal exists in the full duplex radio (FDR) system. If a gain is controlled with a received signal strength indicator (RSSI) in a situation where the SI signal has a larger power than reception (Rx) power, ADC (Analog-to-Digital Converter) processing is performed based on the SI signal, resulting in reduction in digital reception (Rx) signals. In order to address this issue, the present disclosure provides a method for allowing the FDR system to control a gain using another method other than the RSSI-based method.

It will be appreciated by persons skilled in the art that the objects that could be achieved with the present disclosure are not limited to what has been particularly described hereinabove and the above and other objects that the present disclosure could achieve will be more clearly understood from the following detailed description.

In accordance with an aspect of the present disclosure, a method for transmitting and receiving signals by a user equipment (UE) in a wireless communication system may include receiving a first reference signal from a base station (BS); receiving a second reference signal from the base station (BS); measuring power of the received first reference signal and power of the received second reference signal, respectively; and comparing a magnitude of the measured power of the first reference signal with a magnitude of the measured power of the second reference signal, wherein the first reference signal is received in a half-duplex (HD) transmission mode, the second reference signal is received in a full-duplex (FD) transmission mode, and a full-duplex (FD) gain value of the FD transmission mode is changed based on a result of the comparison.

An initial value of the FD gain value may be configured based on transmission (Tx) power, a transmission (Tx) beam pattern, and a reception (Rx) beam pattern.

Based on a case in which an initial value of the configured FD gain value is higher than a half-duplex (HD) gain value indicating a gain value of the HD transmission mode, the FD gain value may be changed to the HD gain value.

The method may further include, after the initial value of the FD gain value is completely configured, measuring power of the received first reference signal and power of the received second reference signal, respectively.

The method may further include, based on a case in which the power of the second reference signal is greater than the power of the first reference signal, reducing the FD gain value; and based on a case in which the power of the second reference signal is lower than the power of the first reference signal, increasing the FD gain value.

Reducing or increasing the FD gain value is as follows. Reducing or increasing the FD gain value may be implemented by reducing or increasing the FD gain value until the power of the second reference signal becomes equal to the power of the first reference signal.

The method may further include, based on a case in which the FD gain value is higher than a predetermined maximum gain value, changing the FD gain value to the predetermined maximum gain value.

The predetermined maximum gain value may be determined based on at least one of self-interference power, an analog-to-digital conversion (ADC) range, a peak-to-average power ratio (PAPR), and a channel state.

In accordance with another aspect of the present disclosure, a user equipment (UE) for transmitting and receiving signals in a wireless communication system may include a transceiver; and a processor, wherein the transceiver is configured to receive a first reference signal and a second reference signal from a base station (BS); and the processor is configured to measure power of the received first reference signal and power of the received second reference signal, respectively, and to compare a magnitude of the measured power of the first reference signal with a magnitude of the measured power of the second reference signal, wherein the first reference signal is received in a half-duplex (HD) transmission mode, the second reference signal is received in a full-duplex (FD) transmission mode, and a full-duplex (FD) gain value of the FD transmission mode is changed based on a result of the comparison.

In accordance with another aspect of the present disclosure, a method for transmitting and receiving signals by a base station (BS) in a wireless communication system may include receiving a first reference signal from a user equipment (UE); receiving a second reference signal from the user equipment (UE); measuring power of the received first reference signal and power of the received second reference signal, respectively; and comparing a magnitude of the measured power of the first reference signal with a magnitude of the measured power of the second reference signal, wherein the first reference signal is received in a half-duplex (HD) transmission mode, the second reference signal is received in a full-duplex (FD) transmission mode, and a full-duplex (FD) gain value of the FD transmission mode is changed based on a result of the comparison.

In accordance with another aspect of the present disclosure, a base station (BS) for transmitting and receiving signals in a wireless communication system may include a transceiver and a processor. The transceiver may receive a first reference signal and a second reference signal. The processor may measure power of the received first reference signal and power of the received second reference signal, respectively, and may compare a magnitude of the measured power of the first reference signal with a magnitude of the measured power of the second reference signal. The first reference signal is received in a half-duplex (HD) transmission mode, the second reference signal is received in a full-duplex (FD) transmission mode, and a full-duplex (FD) gain value of the FD transmission mode is changed based on a result of the comparison.

In accordance with another aspect of the present disclosure, a device for a user equipment (UE) may include at least one processor, and at least one memory operatively connected to the at least one processor, and configured to store instructions such that the at least one processor performs specific operations by executing the instructions. The specific operations include: receiving a first reference signal from a base station (BS); receiving a second reference signal from the base station (BS); measuring power of the received first reference signal and power of the received second reference signal, respectively; and comparing a magnitude of the measured power of the first reference signal with a magnitude of the measured power of the second reference signal, wherein the first reference signal is received in a half-duplex (HD) transmission mode, the second reference signal is received in a full-duplex (FD) transmission mode, and a full-duplex (FD) gain value of the FD transmission mode is changed based on a result of the comparison.

In accordance with another aspect of the present disclosure, a computer-readable storage medium configured to store at least one computer program including instructions such that at least one processor performs operations for a user equipment (UE) by executing the instructions, wherein the operations include: receiving a first reference signal from a base station (BS); receiving a second reference signal from the base station (BS); measuring power of the received first reference signal and power of the received second reference signal, respectively; and comparing a magnitude of the measured power of the first reference signal with a magnitude of the measured power of the second reference signal, wherein the first reference signal is received in a half-duplex (HD) transmission mode, the second reference signal is received in a full-duplex (FD) transmission mode, and a full-duplex (FD) gain value of the FD transmission mode is changed based on a result of the comparison.

As is apparent from the above description, the present disclosure relates to automatic gain control in the FDR system. Since a gain adaptive algorithm based on the change of a channel is applied to the present disclosure, automatic gain control can be efficiently performed.

The effects that can be achieved through the embodiments of the present disclosure are not limited to what has been particularly described hereinabove and other effects which are not described herein can be derived by those skilled in the art from the following detailed description.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 6 illustrates a radio protocol architecture for SL communication.

DETAILED DESCRIPTION

Figure 1:
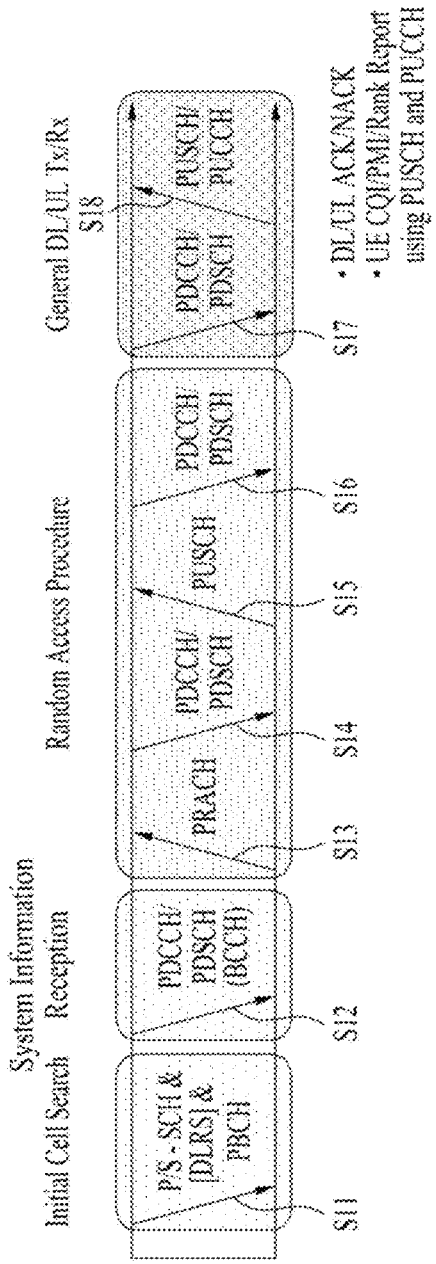
FIG. 1 illustrates physical channels and a general signal transmission method using the physical channels as an exemplary wireless communication system.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details. For example, while the following detailed description is given under the assumption that a mobile communication system is a 3GPP LTE or LTE-A system, the mobile communication system is applicable to other arbitrary mobile communication systems except for matters that are specific to the 3GPP LTE or LTE-A system. In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

In the following description, downlink (DL) refers to communication from a base station (BS) to a user equipment (UE), and uplink (UL) refers to communication from the UE to the BS. On DL, a transmitter may be a part of the BS and a receiver may be a part of the UE. On UL, the transmitter may be a part of the UE and the receiver may be a part of the BS. In the present disclosure, the BS may be represented as a first communication device and the UE may be represented as a second communication device. The BS may be replaced with the term "fixed station", "Node B", "evolved-Node B (eNB)", "next generation Node B (gNB)", "base transceiver system (BTS)", "access point (AP)", "network or 5G network node", "AI system", "roadside unit (RSU)", or "robot". The UE may be replaced with the term "terminal", "mobile station (MS)", "user terminal (UT)", "mobile subscriber station (MSS), "subscriber station (SS)", "advanced mobile station (AMS)", "wireless terminal (WT)", "machine-type communication (MTC) device", "machine-to-machine (M2M) device", "device-to-device (D2D) device", "vehicle", "robot", or "AI module".

Technology described below may be used in various radio access systems such as a code division multiple access (CDMA) system, a frequency division multiple access (FDMA) system, a time division multiple access (TDMA) system, an orthogonal frequency division multiple access (OFDMA) system, and a single-carrier frequency division multiple access (SC-FDMA) system. CDMA may be implemented by radio technology such as universal terrestrial radio access (UTRA) or CDMA2000. TDMA may be implemented by radio technology such as global system for mobile communications (GSM), general packet radio service (GPRS), or enhanced data rates for GSM evolution (EDGE). OFDMA may be implemented by radio technology such as institute of electrical and electronics engineers (IEEE) 802.11 (Wi-Fi), IEEE 802.16 (WiMAX), IEEE 802.20, or evolved-UTRA (E-UTRA). UTRA is part of universal mobile telecommunications system (UMTS). 3rd generation partnership project (3GPP) long-term evolution (LTE) is part of evolved UMTS (E-UMTS) using E-UTRA and LTE-advanced (LTE-A)/LTE-A pro is an evolved version of 3GPP LTE. 3GPP new radio or new radio access technology (NR) is an evolved version of 3GPP LTE/LTE-A pro.

For clarity, a description is given based on a 3GPP communication system (e.g., LTE-A or NR) but the scope of the present disclosure is not limited thereto. LTE refers to technology beyond 3GPP TS 36.xxx Release 8. More specifically, LTE technology beyond 3GPP TS 36.xxx Release 10 is referred to as LTE-A, and LTE technology beyond 3GPP TS 36.xxx Release 13 is referred to as LTE-A pro. 3GPP NR refers to technology beyond TS 38.xxx Release 15. LTE/NR may be referred to as a 3GPP system. "xxx" represents a detailed number of a technical specification. LTE/NR may be collectively referred to as a 3GPP system.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, or repeater may be the node. Furthermore, the node may not be the BS. For example, a radio remote head (RRH) or a radio remote unit (RRU) may be the node. Generally, the RRH or RRU has a power level lower than that of the BS. At least one antenna is installed per node. The antenna may refer to a physical antenna or refer to an antenna port, a virtual antenna, or an antenna group. The node may also be called a point.

In the present disclosure, a cell refers to a specific geographic area or a radio resource in or on which one or more nodes provide communication services. The "cell" of the geographic area may be understood as coverage within which a node may provide services using a carrier, and the "cell" of the radio resource is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of a radio resource used by the node. Accordingly, the term "cell" may be used to indicate service coverage by the node sometimes, the radio resource at other times, or a range within which a signal using the radio resource may reach with valid strength at other times.

In the present disclosure, communicating with a specific cell may mean communicating with a BS or a node that provides communication services to the specific cell. A DL/UL signal of the specific cell refers to a DL/UL signal from/to the BS or the node that provides communication services to the specific cell. A cell that provides UL/DL communication services to a UE is especially called a serving cell. Furthermore, channel status/quality of the specific cell refers to status/quality of a channel or a communication link formed between the BS or the node that provides communication services to the specific cell and the UE.

The "cell" associated with the radio resource may be defined by a combination of DL resources and UL resources, i.e., a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information transmitted through a corresponding cell. In this case, the carrier frequency may be equal to or different from a center frequency of each cell or CC. Hereinbelow, a cell operating on a primary frequency will be referred to as a primary cell (Pcell) or a primary CC (PCC), and a cell operating on a secondary frequency will be referred to as a secondary cell (Scell) or a secondary CC (SCC). The Scell may be configured after a UE and a BS perform a radio resource control (RRC) connection establishment procedure and thus RRC connection is established between the UE and the BS, i.e., after the UE is in an RRC_CONNECTED state. RRC connection may mean a path through which RRC of the UE may exchange messages with RRC of the BS. The Scell may be configured to provide additional radio resources to the UE. The Scell may form a set of serving cells for the UE together with the Pcell according to capabilities of the UE. Only one serving cell configured only with the Pcell exists for an RRC_CONNECTED UE which is not configured with carrier aggregation or does not support carrier aggregation.

A cell supports a unique radio access technology (RAT). For example, LTE RAT-based transmission/reception is performed on an LTE cell, and 5G RAT-based transmission/reception is performed on a 5G cell.

Carrier aggregation (CA) refers to technology using a plurality of carriers each having a narrower system bandwidth than a target bandwidth through aggregation to support broadband. CA differs from OFDMA in that DL or UL communication is performed using a plurality of carrier frequencies each forming a system bandwidth (or channel bandwidth) in the former, and DL or UL communication is performed by carrying a base frequency band divided into a plurality of orthogonal subcarriers in one carrier frequency in the latter. In OFDMA or orthogonal frequency division multiplexing (OFDM), for example, one frequency band having a certain system bandwidth is divided into a plurality of subcarriers with a predetermined subcarrier spacing, information/data is mapped to the plurality of subcarriers, and the frequency band to which the information/data has been mapped is transmitted in a carrier frequency of the frequency band through frequency upconversion. In wireless CA, frequency bands each having a system bandwidth and a carrier frequency may be used simultaneously used for communication, and each frequency band used in CA may be divided into a plurality of subcarriers with a predetermined subcarrier spacing.

The 3GPP-based communication standards define DL physical channels corresponding to resource elements (REs) carrying information originated from upper layers of a physical layer (e.g., a medium access control (MAC) layer, a radio link control (RLC) layer, a packet data convergence protocol (PDCP) layer, an RRC layer, a service data adaptation protocol (SDAP) layer, and a non-access stratum (NAS) layer), and DL physical signals corresponding to REs which are used in the physical layer but do not deliver information originated from the upper layers. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal (RS) and a synchronization signal are defined as the DL physical signals. The RS, also called a pilot, means a signal of a predefined special waveform known to both a BS and a UE. For example, a cell-specific RS (CRS), a UE-specific RS (UE-RS), a positioning RS (PRS), a channel state information RS (CSI-RS), and a demodulation RS (DMRS) are defined as DL RSs. The 3GPP-based communication standards also define UL physical channels corresponding to REs carrying information originated from upper layers, and UL physical signals corresponding to REs which are used in the physical layer but do not carry information originated from the upper layers. For example, a physical uplink shared channel (PUSCH), a physical uplink control channel (PUCCH), and a physical random access channel (PRACH) are defined as the UL physical channels, and a DMRS for a UL control/data signal and a sounding reference signal (SRS) used for UL channel measurement are defined for the UL physical signals.

In the present disclosure, the PDCCH and the PDSCH may refer to a set of time-frequency resources or REs that carry downlink control information (DCI) and DL data, respectively. The PUCCH, PUSCH, and PRACH refer to a set of time-frequency resources or REs that carry uplink control information (UCI), UL data, and random access signals, respectively. In the following description, "the UE transmits a UL physical channel (e.g., a PUCCH, PUSCH, or PRACH)" may mean that the UE transmits the UCI, UL data, or random access signals on or through the UL physical channel, and "the BS receives a UL physical channel" may mean that the BS receives the UCI, UL data, or random access signals on or through the UL physical channel. "The BS transmits a DL physical channel (e.g., a PDCCH or PDSCH)" may mean that the BS transmits the DCI or DL data on or through the DL physical channel, and "the UE receives a DL physical channel" may mean that the UE receives the DCI or DL data on or through the DL physical channel.

In the present disclosure, a transport block (TB) is payload for a physical layer. For example, data provided to the physical layer by an upper layer or a MAC layer is basically referred to as a TB.

In the present disclosure, hybrid automatic repeat and request (HARQ) is a kind of error control technique. HARQ acknowledgement (HARQ-ACK) transmitted on DL is used for error control of UL data, and HARQ-ACK transmitted on UL is used for error control of DL data. A transmitter performing a HARQ operation awaits reception of ACK after transmitting data (e.g., a TB or a codeword). A receiver performing a HARQ operation transmits ACK only when data has been successfully received and transmits negative ACK (NACK) when the received data has an error. Upon receipt of ACK, the transmitter may transmit (new) data, and upon receipt of NACK, the transmitter may retransmit the data. Time delay occurs until a BS receives ACK/NACK from a UE and transmits retransmission data after transmitting scheduling information and data according to the scheduling information. The time delay is generated due to channel propagation delay or time consumed for data decoding/encoding. Accordingly, if new data is transmitted after a HARQ process which is currently in progress is ended, a gap in data transmission occurs due to time delay. In order to prevent the gap in data transmission from occurring during a time delay duration, a plurality of independent HARQ processes is used. For example, when there are 7 transmission occasions between initial transmission and retransmission, a communication device may perform 7 independent HARQ processes to transmit data without any gap. A plurality of parallel HARQ processes enables successive UL/DL transmission while the device awaits HARQ feedback for previous UL/DL transmission.

In the present disclosure, channel state information (CSI) generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

For the background technology, terminology, and abbreviations used in the present disclosure, reference may be made to standard specifications published before the present disclosure. For example, reference may be made to the following documents.

3GPP LTE
   3GPP TS 36.211: Physical channels and modulation
   3GPP TS 36.212: Multiplexing and channel coding
   3GPP TS 36.213: Physical layer procedures
   3GPP TS 36.214: Physical layer; Measurements
   3GPP TS 36.300: Overall description
   3GPP TS 36.304: User Equipment (UE) procedures in idle mode
   3GPP TS 36.314: Layer 2—Measurements
   3GPP TS 36.321: Medium Access Control (MAC) protocol
   3GPP TS 36.322: Radio Link Control (RLC) protocol
   3GPP TS 36.323: Packet Data Convergence Protocol (PDCP)
   3GPP TS 36.331: Radio Resource Control (RRC) protocol
   3GPP TS 23.303: Proximity-based services (Prose); Stage 2
   3GPP TS 23.285: Architecture enhancements for V2X services
   3GPP TS 23.401: General Packet Radio Service (GPRS) enhancements for Evolved Universal Terrestrial Radio Access Network (E-UTRAN) access
   3GPP TS 23.402: Architecture enhancements for non-3GPP accesses
   3GPP TS 23.286: Application layer support for V2X services; Functional architecture and information flows
   3GPP TS 24.301: Non-Access-Stratum (NAS) protocol for Evolved Packet System (EPS); Stage 3
   3GPP TS 24.302: Access to the 3GPP Evolved Packet Core (EPC) via non-3GPP access networks; Stage 3
   3GPP TS 24.334: Proximity-services (ProSe) User Equipment (UE) to ProSe function protocol aspects; Stage 3
   3GPP TS 24.386: User Equipment (UE) to V2X control function; protocol aspects; Stage 3

3GPP NR
   3GPP TS 38.211: Physical channels and modulation
   3GPP TS 38.212: Multiplexing and channel coding
   3GPP TS 38.213: Physical layer procedures for control
   3GPP TS 38.214: Physical layer procedures for data
   3GPP TS 38.215: Physical layer measurements
   3GPP TS 38.300: NR and NG-RAN Overall Description
   3GPP TS 38.304: User Equipment (UE) procedures in idle mode and in RRC inactive state
   3GPP TS 38.321: Medium Access Control (MAC) protocol
   3GPP TS 38.322: Radio Link Control (RLC) protocol
   3GPP TS 38.323: Packet Data Convergence Protocol (PDCP)
   3GPP TS 38.331: Radio Resource Control (RRC) protocol
   3GPP TS 37.324: Service Data Adaptation Protocol (SDAP)
   3GPP TS 37.340: Multi-connectivity; Overall description
   3GPP TS 23.287: Application layer support for V2X services; Functional architecture and information flows
   3GPP TS 23.501: System Architecture for the 5G System
   3GPP TS 23.502: Procedures for the 5G System
   3GPP TS 23.503: Policy and Charging Control Framework for the 5G System; Stage 2
   3GPP TS 24.501: Non-Access-Stratum (NAS) protocol for 5G System (5GS); Stage 3
   3GPP TS 24.502: Access to the 3GPP 5G Core Network (5GCN) via non-3GPP access networks
   3GPP TS 24.526: User Equipment (UE) policies for 5G System (5GS); Stage 3

Overview of 3GPP System

Physical Channels and General Signal Transmission

In a wireless access system, a user equipment (UE) may receive information from a base station (BS) through downlink (DL) and may transmit information to the BS through uplink (UL). Transmission/reception (Tx/Rx) information between the UE and the BS may include general data information and various control information, and various physical channels may exist according to types/usages of the Tx/Rx information.

FIG. 1 illustrates physical channels and a general method for transmitting signals on the physical channels.

Referring to FIG. 1, when a UE is powered on or enters a new cell, the UE performs initial cell search (S11). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB.

Then the UE may acquire information broadcast in the cell by receiving a physical broadcast channel (PBCH) from the eNB.

During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S12).

If the UE initially accesses the eNB or has no radio resources for signal transmission to the eNB, the UE may perform a random access procedure with the eNB (S13 to S16). In the random access procedure, the UE may transmit a predetermined sequence as a preamble on a physical random access channel (PRACH) (S13 and S15) and may receive a response message to the preamble on a PDCCH and a PDSCH associated with the PDCCH (S14 and S16). In the case of a contention-based RACH, the UE may additionally perform a contention resolution procedure.

On the other hand, when the random access process is performed in two steps, S13/S15 may be performed as one operation in which the UE performs data transmission, and S14/S16 may be performed as one operation in which the BS performs data transmission.

After the above procedure, the UE may receive a PDCCH and/or a PDSCH from the eNB (S17) and transmit a physical uplink shared channel (PUSCH) and/or a physical uplink control channel (PUCCH) to the eNB (S18), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

NR Radio Access

As more and more communication devices demand larger communication capacity, there is a need for enhanced mobile broadband (eMBB) communication relative to legacy RAT. In addition, massive machine type communication (mMTC) for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, mMTC, ultra-reliable and low-latency communication (URLLC), and the like. In the present disclosure, such technology is referred to as NR. NR is an expression representing an example of fifth-generation (5G) RAT.

A new RAT system including NR uses an OFDM transmission scheme or a transmission scheme similar thereto. The new RAT system may follow OFDM parameters different from OFDM parameters of LTE. Alternatively, the new RAT system may follow numerology of legacy LTE/LTE-A as it is or have a larger system bandwidth (e.g., 100 MHz). Alternatively, one cell may support a plurality of numerologies. In other words, UEs that operate with different numerologies may coexist in one cell.

Numerology corresponds to one subcarrier spacing in a frequency domain. By scaling the reference subcarrier spacing by an integer 'N', different numerologies can be defined.

Figure 2:
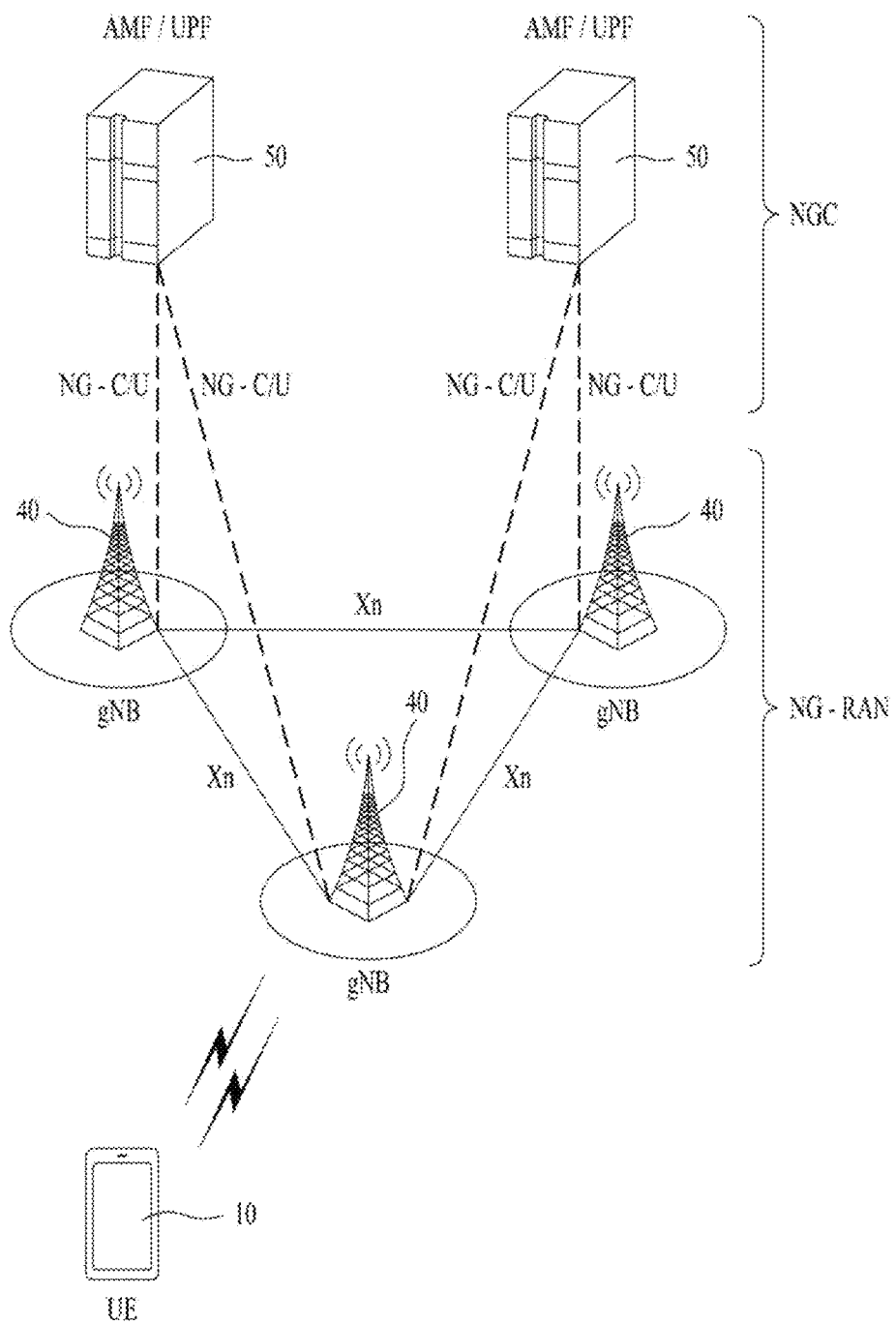
FIG. 2 illustrates the structure of an NR system to which embodiment(s) are applicable.

FIG. 2 illustrates the structure of a NR system to which the present disclosure is applicable.

Figure 4:
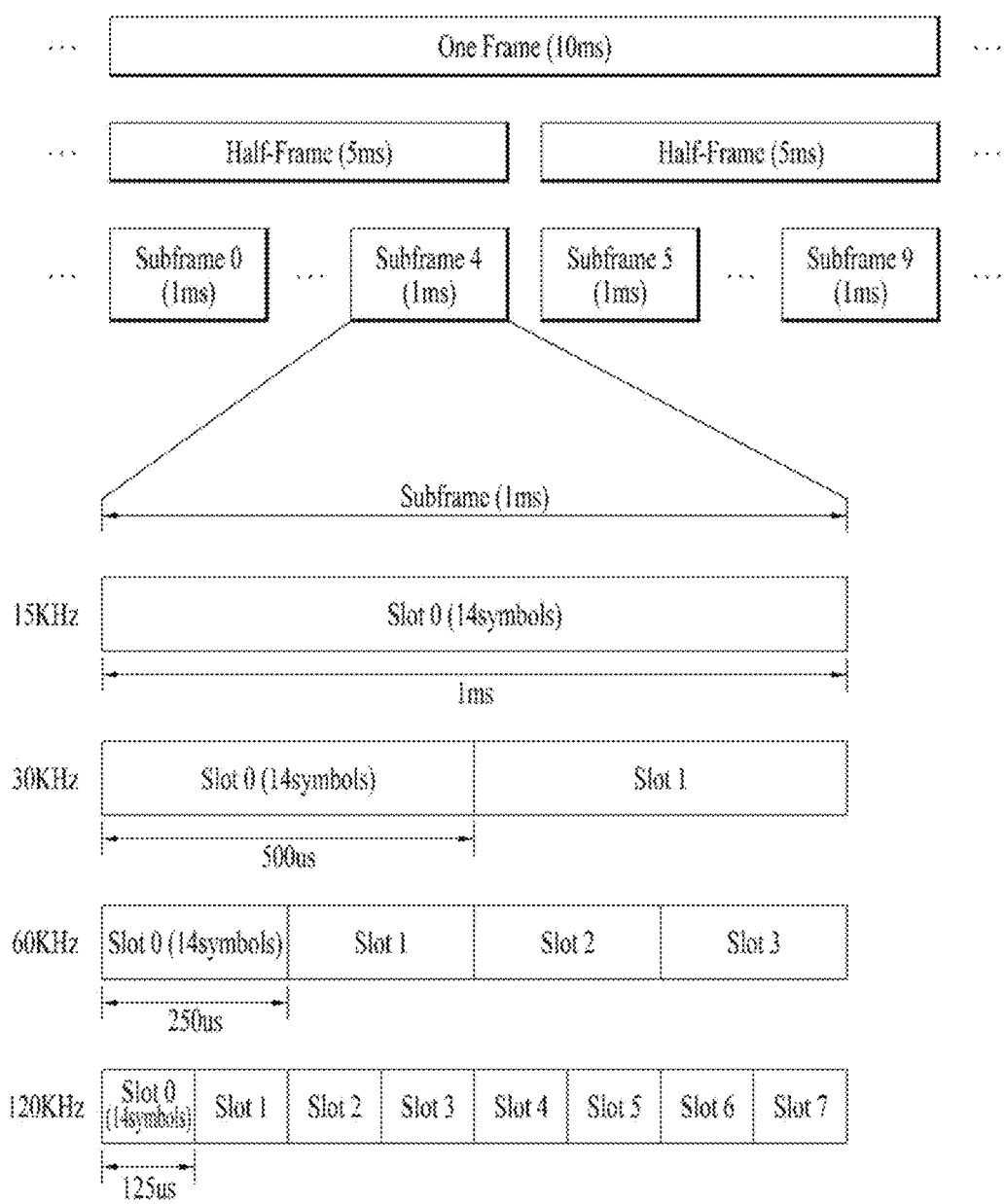
FIG. 4 illustrates the structure of an NR radio frame to which embodiment(s) are applicable.

Referring to FIG. 2, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 3:
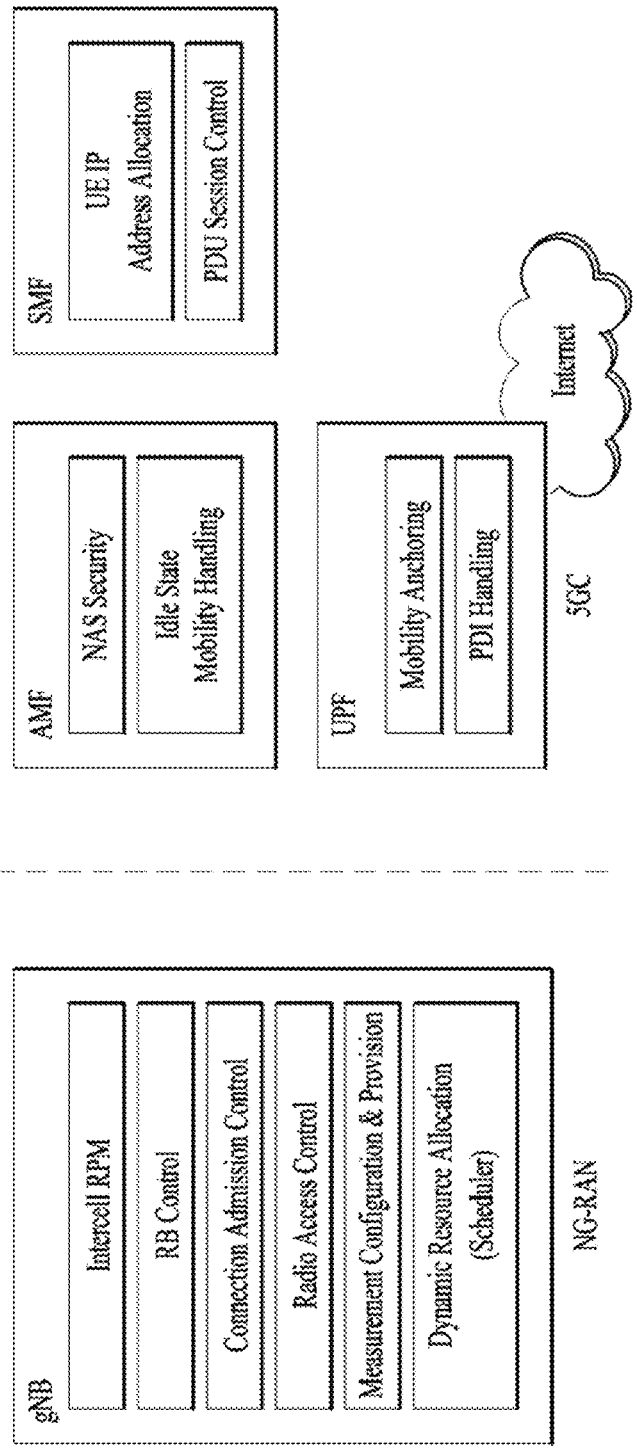
FIG. 3 illustrates functional split between an NG-RAN and a 5GC to which embodiment(s) are applicable.

FIG. 3 illustrates functional split between the NG-RAN and the 5GC to which the present disclosure is applicable.

Referring to FIG. 3, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration $\mu$ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
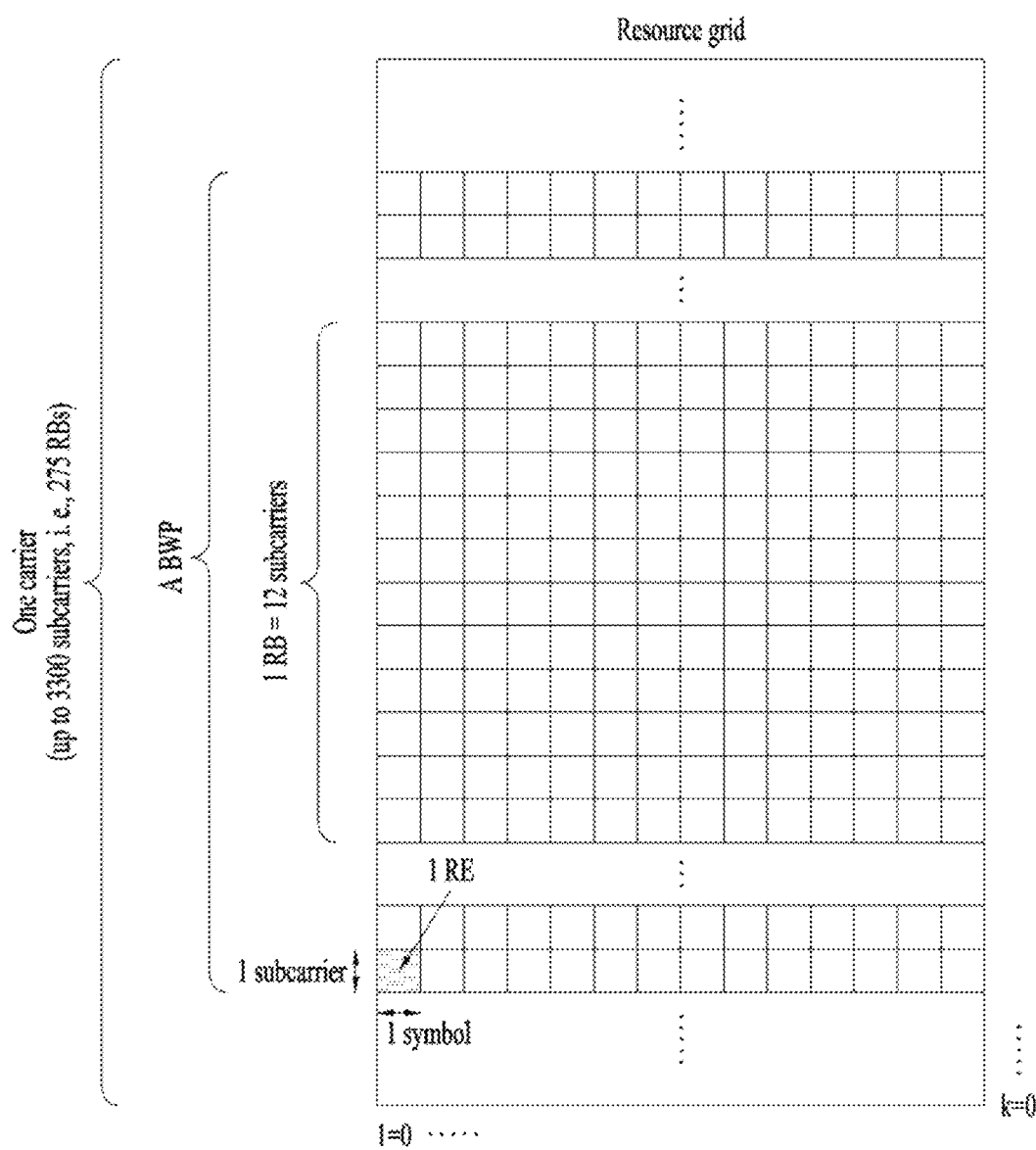
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

FIG. 6 illustrates a radio protocol architecture for SL communication.

Figure 8:
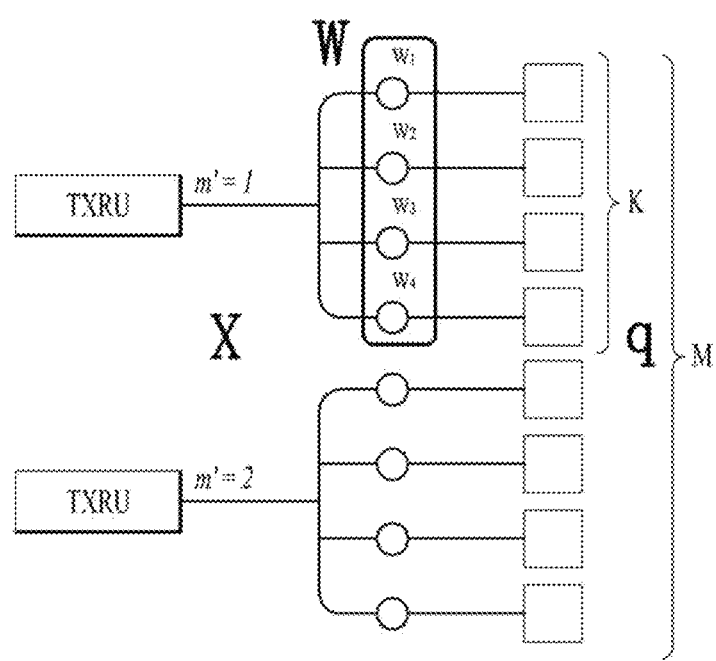
FIGS. 8 and 9 are diagrams illustrating representative methods of connecting transceiver units (TXRUs) to antenna elements.

Specifically, FIG. 6-(a) shows a user plane protocol stack of NR, and FIG. 8-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
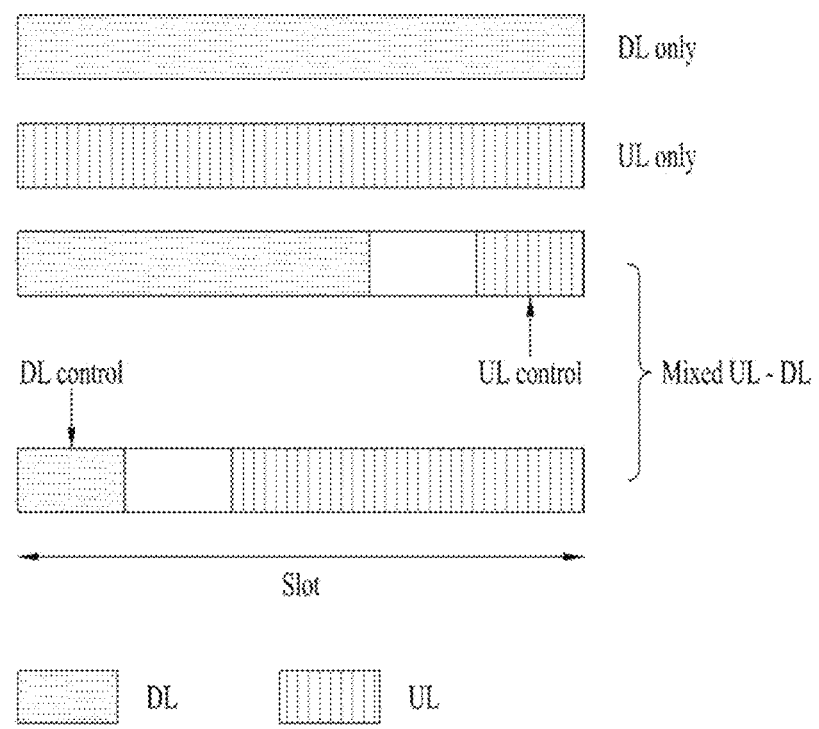
FIG. 7 illustrates a structure of a self-contained slot.

FIG. 7 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 9:
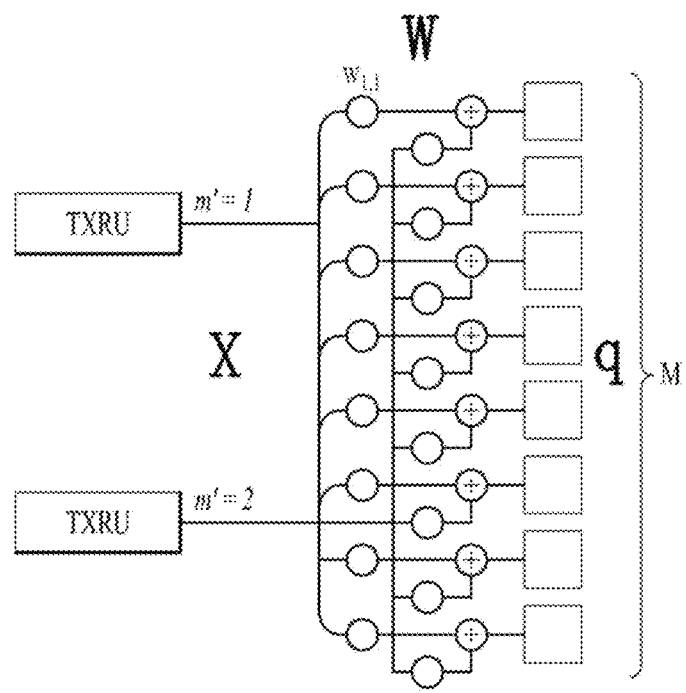

FIGS. 8 and 9 are diagrams illustrating representative methods for connecting TXRUs to antenna elements. Here, the TXRU virtualization model represents the relationship between TXRU output signals and antenna element output signals.

FIG. 8 shows a method for connecting TXRUs to sub-arrays. In FIG. 8, one antenna element is connected to one TXRU.

Meanwhile, FIG. 9 shows a method for connecting all TXRUs to all antenna elements. In FIG. 9, all antenna elements are connected to all TXRUs. In this case, separate addition units are required to connect all antenna elements to all TXRUs as shown in FIG. 9.

In FIGS. 8 and 9, W indicates a phase vector weighted by an analog phase shifter. That is, W is a major parameter determining the direction of the analog beamforming. In this case, the mapping relationship between channel state information reference signal (CSI-RS) antenna ports and TXRUs may be 1:1 or 1-to-many.

The configuration shown in FIG. 8 has a disadvantage in that it is difficult to achieve beamforming focusing but has an advantage in that all antennas can be configured at low cost.

On the contrary, the configuration shown in FIG. 9 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 10:
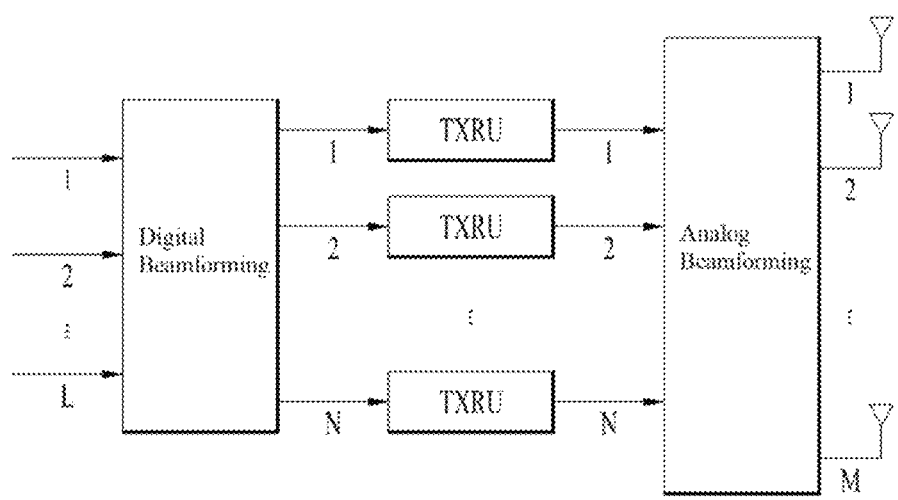
FIG. 10 is a schematic diagram illustrating a hybrid beamforming structure from the perspective of TXRUs and physical antennas according to an example of the present disclosure.
Figure 13:
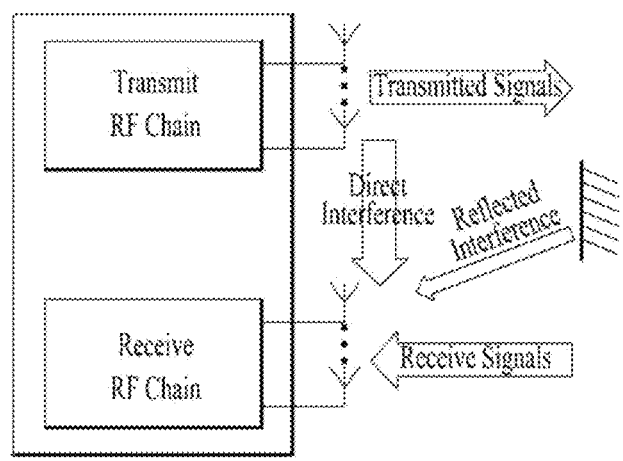
FIG. 13 is a conceptual diagram exemplarily showing Tx/Rx link and Self-Interference (SI) in FDR communication situation.

FIG. 10 is a diagram schematically illustrating an exemplary hybrid BF structure from the perspective of TXRUs and physical antennas according to the present disclosure. In FIG. 13, the number of digital beams is L and the number analog beams is N.

Additionally, in the NR system to which the present disclosure is applicable, an BS designs analog BF to be changed in units of symbols to provide more efficient BF support to a UE located in a specific area. Furthermore, as illustrated in FIG. 13, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

Figure 11:
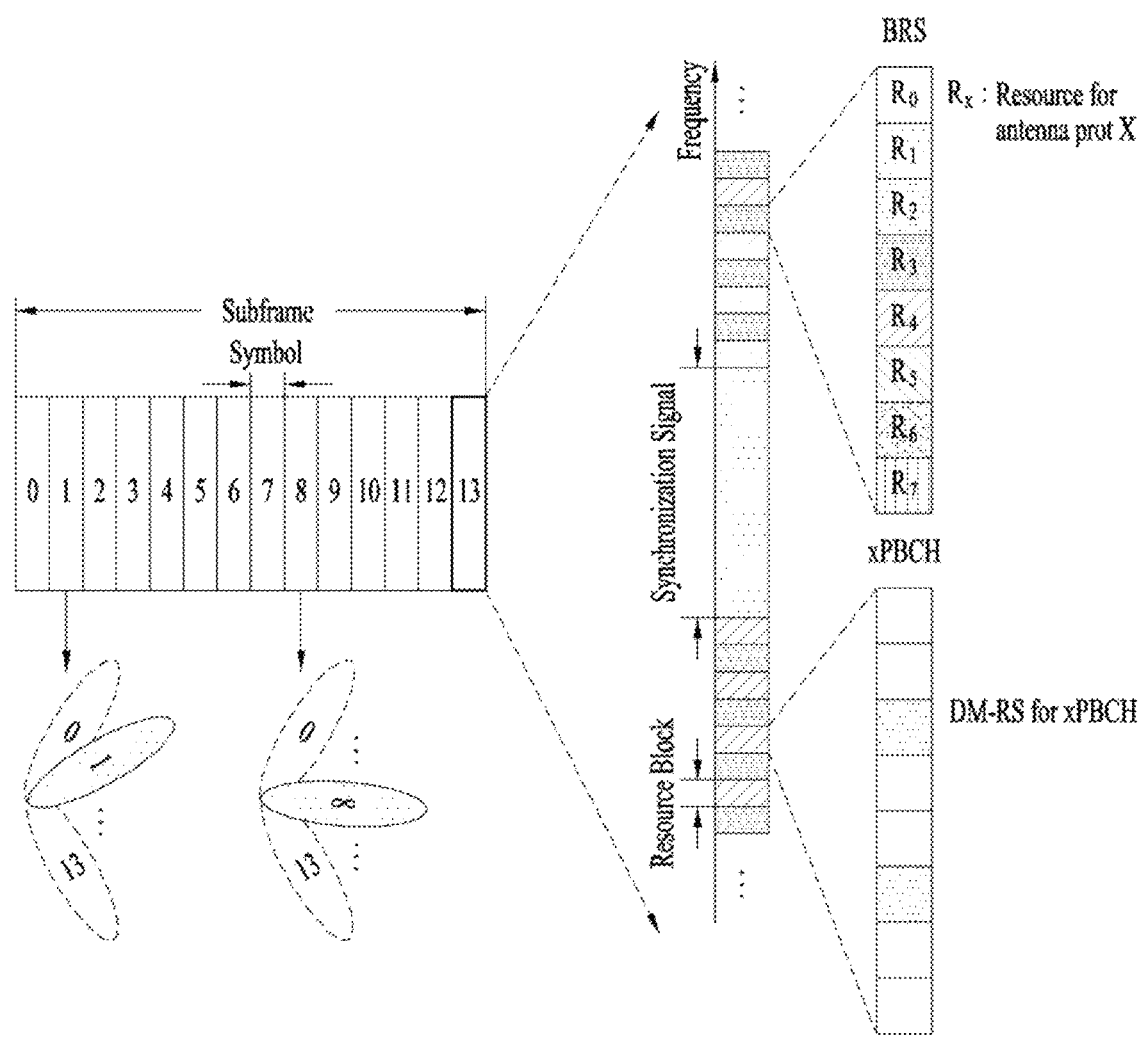
FIG. 11 is a schematic diagram illustrating a beam sweeping operation for a synchronization signal and system information in a downlink transmission procedure according to an example of the present disclosure.

FIG. 11 is a diagram schematically illustrating an exemplary beam sweeping operation for a synchronization signal and system information in a DL transmission procedure according to the present disclosure.

In FIG. 11 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 11, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

MIMO RS (Reference Signal)

DMRS (Demodulation Reference Signal)

In order to increase network energy efficiency and to guarantee forward compatibility, DMRS of the NR system is characterized in that the DMRS can be transmitted only when necessary. A time domain density of the DMRS may vary depending on the speed or mobility of the UE. In order to track a fast change in a radio channel in NR, the density for the DMRS in the time domain can be increased to track fast change in radio channels in NR.

(1) DL DMRS Related Operation

The DMRS-related operation for PDSCH transmission/reception will be described.

The BS may transmit DMRS configuration information to the UE. The DMRS configuration information may refer to 'DMRS-DownlinkConfig IE'. The DMRS-DownlinkConfig IE may include a 'dmrs-Type' parameter, a 'dmrs-AdditionalPosition' parameter, a 'maxLength' parameter, a 'phaseTrackingRS' parameter, and the like. The 'dmrs-Type' parameter is a parameter for selecting the DMRS type to be used for DL. In NR, DMRS can be divided into two configuration types, i.e., (1) DMRS configuration type 1 and (2) DMRS configuration type 2. DMRS configuration type 1 has a higher RS density in the frequency domain, and DMRS configuration type 2 has many more DMRS antenna ports. The 'dmrs-AdditionalPosition' parameter is a parameter indicating the position of additional DMRS on downlink (DL). The 'maxLength' parameter is a parameter indicating the maximum number of OFDM symbols for DL front-loaded DMRS. The 'phaseTrackingRS' parameter is a parameter for configuring a DL PTRS.

As for the DMRS, the first position of the front-loaded DMRS may be determined according to the PDSCH mapping type (Type A or Type B), and an additional DMRS may be configured to support a high-speed UE. The front-loaded DMRS may occupy one or two consecutive OFDM symbols, and may be indicated by RRC signaling and DCI.

The BS may generate a sequence used for DMRS based on the DMRS configuration (S120). The BS may map the generated sequence to resource elements (S130). Here, the resource element may include at least one of time, frequency, antenna port, or code.

The BS may transmit the DMRS to the UE using the resource elements. The UE may receive the PDSCH using the received DMRS.

(2) UL DMRS Related Operation

The DMRS-related operation for PUSCH reception will be described.

The UL DMRS-related operation is similar to the DL DMRS-related operation, and names of DL-related parameters may be replaced with names of UL-related parameters. For example, DMRS-DownlinkConfig IE may be replaced with DMRS-UplinkConfig IE, PDSCH mapping type may be replaced with PUSCH mapping type, and PDSCH may be replaced with PUSCH. In the DL DMRS related operation, the BS may be replaced with the UE, and the UE may be replaced with the BS.

Sequence generation for UL DMRS may be defined differently depending on whether transform precoding is enabled. For example, DMRS uses a pseudo-noise (PN) sequence when cyclic prefix orthogonal frequency division multiplexing (CP-OFDM) is used. Alternatively, DMRS uses a Zadoff-Chu (ZC) sequence having a length of 30 or more when Discrete Fourier Transform-spread-OFDM (DFT-s-OFDM) is used (i.e., when transform precoding is available).

Overview of FDR System and Interference Factors in FDR

The FDR transmission/reception (Tx/Rx) system capable of simultaneously transmitting and receiving UL and DL signals on the same frequency band may perform frequency division or time division so that spectral efficiency of the FDR Tx/Rx system can be two times higher than the existing system. As a result, the FDR Tx/Rx system is spotlighted as one of the core technologies of the next generation 5G mobile communication system.

FDR configured to use a single frequency transmission band can be defined as a transmission resource configuration method that simultaneously performs data transmission/reception through a single frequency transmission band from the point of view of any wireless device. As a special example of the FDR, wireless communication between a general BS (or a repeater, a relay node, a remote radio head (RRH), etc.) and a wireless UE can be expressed as a transmission (Tx) resource configuration method in which DL transmission and UL reception of the BS and DL reception and UL transmission of the wireless UE are simultaneously performed through a single frequency transmission band. As another example, in a device-to-device (D2D) direct communication situation between wireless UEs, the FDR can also be expressed as a transmission resource configuration method in which transmission and reception of the wireless UEs are simultaneously performed in the same frequency transmission band. In the following disclosure, a general method for performing wireless communication between the BS and the wireless UE and FDR-related proposed technologies will be described, but the scope or spirit of the present disclosure is not limited thereto. Furthermore, the present disclosure may include an example of wireless communication with a network wireless device capable of wirelessly communicating with the UE other than the BS, and may further include D2D direct communication as needed.

Figure 12:
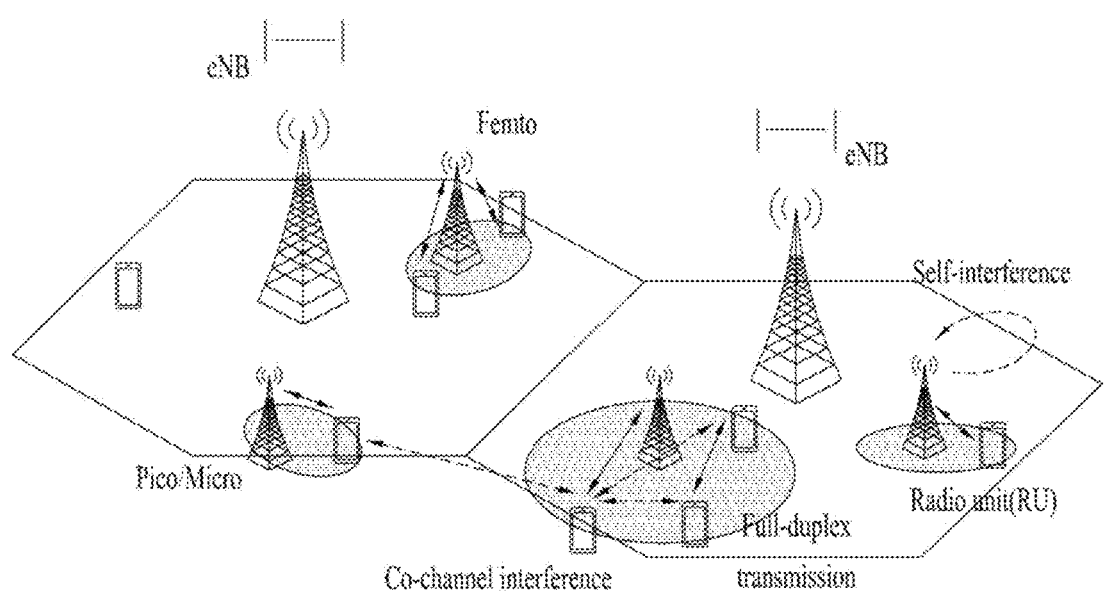
FIG. 12 shows the conceptual diagram of a user equipment and base station supportive of FDR.

FIG. 12 shows the conceptual diagram of a user equipment and base station supportive of FDR.

In the FDR situation shown in FIG. 12, total three types of interferences exist as follows.

Intra-device self-interference: As transmission and reception are performed with the same time and frequency resources, a signal transmitted by a device itself is simultaneously received as well as a desired signal. In this case, as the signal transmitted by the device itself barely has attenuation and is received by a Rx antenna of its own, it is received with power much greater than that of the desired signal, which means that it works as interference.

UE to UE inter-link interference: A UL signal transmitted by a UE is received by an adjacently located UE, thereby working as interference.

BS to BS inter-link interference: A signal transmitted between base stations or heterogeneous base stations (Picocell, femtocell, relay node) in HetNet situation is received by an Rx antenna of another base station, thereby working as interference.

Intra-device self-interference (hereinafter referred to as self-interference (SI)) among these three types of interference may be interference that occurs only in the FDR system and greatly degrades performance of the FDR system. Accordingly, in order to efficiently operate and manage the FDR system, the SI is the most serious problem to be solved first.

FIG. 13 is a conceptual diagram exemplarily showing Tx/Rx link and Self-Interference (SI) in FDR communication situation.

As shown in FIG. 13, Self-Interference (SI) may be categorized into direct interference that a signal transmitted from a Tx antenna directly enters an Rx antenna of its own without path attenuation and reflected interference that the signal is reflected by the surrounding terrain. And, a size of the SI is extremely larger than that of a desired signal due to a physical distance difference. Due to the intensity of the extremely large interference, effective cancellation of self-interference is required for the drive of FDR system.

In order to effectively drive the FDR system, requirements of Self-Interference Cancellation (Self-IC) according to maximum transmission power of a device may be determined as Table 5 (Self-IC requirements (BW=20 MHz) up FDR application in a mobile communication system).

TABLE 5

| Node Type | Max. tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB(for UE) | −92 dBm | 115 dB |

Referring to Table 5, it can be observed that Self-IC performance of 119 dBm is necessary in order for a User Equipment (UE) to effectively drive an FDR system on a BandWidth (BW) of 20 MHz. A thermal noise value may change into $N_{0,BW}$=−174 dBm+10×$\log_{10}$(BW) depending on a bandwidth of a mobile communication system, and Table 7 was found on the assumption of a bandwidth of 20 MHz. Regarding Table 7, Receiver Noise Figure (NF) considers a worst case by referring to 3GPP specification requirements. A receiver thermal noise level is determined as a sum of thermal noise and receiver NF on a specific BW.

Figure 14:
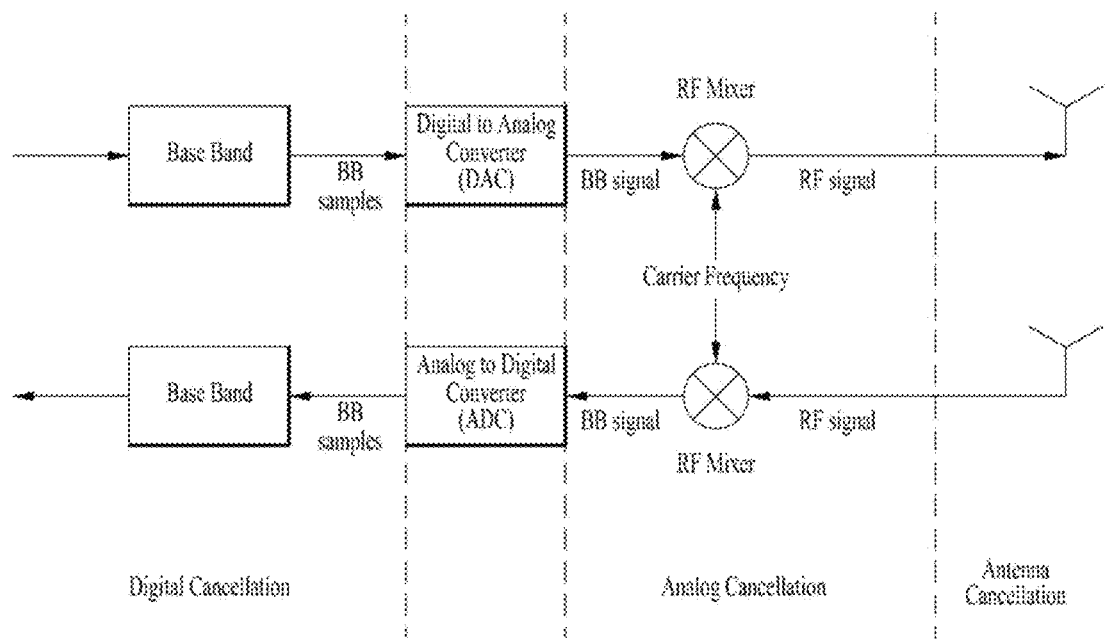
FIG. 14 is a diagram showing positions for applying there kinds of interference schemes in an RF Tx/Rx stage (or RF front end) of a device.

Types of Self-Interference Cancellation (Self-IC) Schemes and Application Methods FIG. 14 is a diagram showing positions for applying there kinds of interference schemes in an RF Tx/Rx stage (or RF front stage) of a device. In FIG. 14, application positions of three kinds of Self-IC schemes are illustrated. Hereinafter, the three kinds of Self-IC schemes are schematically described.

Antenna Self-IC: a Self-IC scheme supposed to be executed most preferentially among all Self-IC schemes is an antenna Self-IC scheme. SI cancellation is performed in an antenna stage. Most simply, a portion of an SI signal can be cancelled in a manner of physically cutting off a transfer of the SI signal by installing an object capable of cutting off a signal between a Tx antenna and an Rx antenna, artificially adjusting an inter-antenna distance by utilizing multiple antennas, or giving phase inversion to a specific Tx signal. Moreover, a portion of an SI signal may be cancelled by utilizing multiple polarized antennas or a directional antenna.

Analog Self-IC: This is a scheme of cancelling an SI signal using an analog signal copied by a scheme of cancelling interference in an analog stage before a received signal passes through Analog-to-Digital Converter (ADC). This may be performed in an RF or IF region. A method of cancelling an SI signal is described in detail as follows. First of all, a copy signal of an actually received SI signal is generated in a manner of time-delaying a transmitted analog signal and then adjusting an amplitude and phase of the signal and then subtracted from a signal received through an RX antenna. Yet, since it is processed using the analog signal, additional distortion may occur due to implementation complexity and circuit characteristics, which is disadvantageous in that interference cancellation performance may be changed considerably.

Digital Self-IC: This is a scheme of cancelling interference after a received signal has passed through ADC and includes all interference cancellation schemes performed in a baseband region. Most simply, it can be implemented in a manner of making a copy signal of SI using a transmitted digital signal and then subtracting it from a received digital signal. Alternatively, schemes for preventing a transmitted signal of a UE or BS from being received through an Rx antenna in a manner of performing precoding/postcoding on a baseband using multiple antennas may be classified as Digital Self-IC. However, Digital Self-IC is possible if a digitally modulated signal is quantized enough to reconstruct information on a desired signal. Thus, in order to perform Digital Self-IC, it is necessary to premise condition that a signal power level difference between an interference signal, which remains after cancelling interference using at least one of the above schemes, and a desired signal should enter an ADC range.

Figure 15:
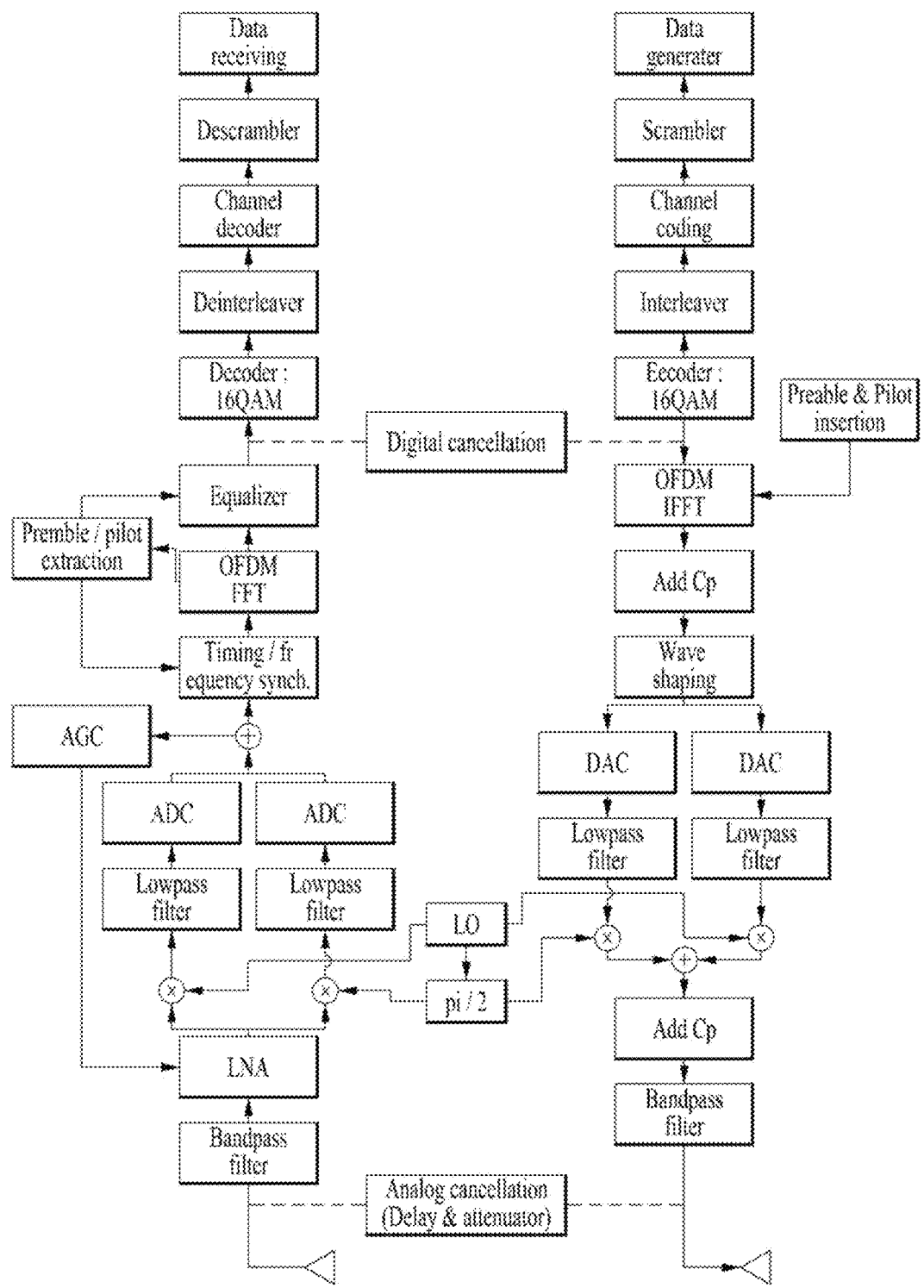
FIG. 15 is a block diagram diagrammatizing a device for Self-Interference Clearance (Self-IC) in a communication device proposed in a communication system environment using OFDM based on FIG. 11.

FIG. 15 is a block diagram diagrammatizing a device for Self-Interference Cancellation (Self-IC) in a communication device proposed in a communication system environment using OFDM based on FIG. 14.

Regarding a location of a Digital Self-IC block, although FIG. 15 shows that it is performed directly using digital SI signal information before DAC and digital SI signal information after ADC, it may be performed using a digital SI signal after IFFT and a digital SI signal before FFT. In addition, although FIG. 15 is the conceptual diagram showing that a SI signal is cancelled by separating a Tx antenna and an Rx antenna from each other, antenna configuration may be different that of FIG. 15 in case of using an antenna interference cancellation scheme using a single antenna.

Signal Modeling of FDR System

Since the FDR system uses the same frequency between the transmission (Tx) signal and the reception (Rx) signal, non-linear components in RF may greatly affect the FDR system. Specifically, the Tx signals may be distorted by non-linear characteristics of active elements such as a power amplifier (PA) of the Tx RF chain and a low noise amplifier (LNA) of the Rx RF chain, and may also be distorted by a mixer for use in the Tx/Rx RF chains. Tx signals generated by such distortion can be modeled as signals caused by high-order components. Since even-order components affects a high frequency region corresponding to several times the peripheral and intermediate (center) frequencies of the DC, the even-order components can be effectively removed using the legacy AC coupling or filtering method. However, since odd-order components are generated adjacent to the legacy intermediate frequency, they cannot be easily removed unlike even-order components. As a result, the received odd-order components may greatly affect system performance. Considering the non-linear characteristics of the odd-order components, the reception (Rx) signal to be received after the ADC of the FDR system can be expressed by the following equation 1 according to the Parallel Hammerstein (PH) model.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \text{ [Equation 1]}$$

In Equation 1, $x_D(n)$ is data to be received, $h_D(n)$ is a data channel experienced by the data to be received, $x_{SI}^{(n)}$ is data that was transmitted from the system, $h_{SI,k}(n)$ is a self-channel experienced by the data that was transmitted from the system, wherein, if k is '1', this means linear components, if k is an odd value of 3 or more, this means non-linear components, and 'z(n)' is Additive White Gaussian Noise (AWGN).

Figure 16:
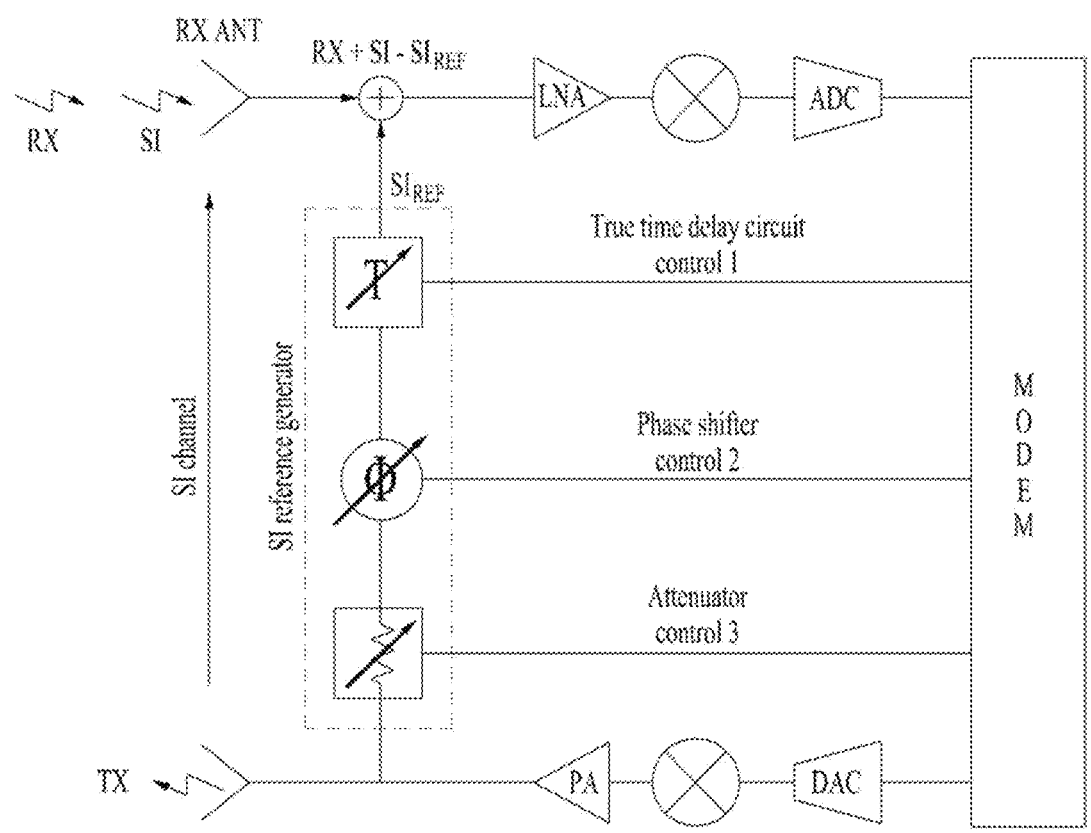
FIG. 16 is a diagram showing an RF chain of a communication device for performing general Full Duplex Radio (FDR) technology.

FIG. 16 is a diagram showing an RF chain of a communication device for performing general Full Duplex Radio (FDR) technology.

In order to cancel an SI signal in a communication device using FDR, it is necessary to generate a copy signal (hereinafter, SI interference signal) exactly identical to the SI signal. Referring to FIG. 3, for the cancellation of an SI signal, a method of subtracting an SI reference signal SIREF from an SI signal (SI) before LNA of an Rx stage of an RX chain is used in general. In this case, in order to generate the SI reference signal SIREF in the communication device, a Tx signal of a Tx stage is diverged (e.g., a case of diversion after PA in the Tx stage is shown in FIG. 3) and a portion of the Tx signal is then set to pass through an SI reference generator including an attenuator, a phase shifter and a true time delay circuit. The SI reference generator generates an SI reference signal to imitate an SI channel using the diverged Tx signal. In doing so, in order for the SI reference generator to imitate the SI channel, a channel into which the SI signal is put is estimated separately.

The communication device may estimate the SI channel and then generate a control signal inputted to the true time delay circuit, a control signal inputted to the phase shifter, and a control signal inputted to the attenuator. In this case, an SI reference signal path and a desired Rx signal should be in a state of not coming in entirely.

As a method for a communication device to control an SI reference generator, there may be two kinds of methods.

According to a first method, in order to separately estimate an SI signal incoming channel, a communication device stops communication and transmits an SI channel estimation signal (e.g., pilot signal, reference signal, etc.) on an allocated communication band (or a channel band) and an SI reference generator may imitate an SI signal upon communication using information of the SI channel estimation signal.

According to a second method, a communication device may transmit an SI signal channel estimation signal (e.g., reference signal, pilot signal, tone, etc.) carried on both ends (e.g., guard band) of a communication channel band and control an SI reference generator in a direction that the corresponding SI signal channel estimation signal is reduced according to an adaptive feedback algorithm.

In the first method, to find an optimized state of the SI reference generator, it is necessary to estimate an SI channel. To this end, a Tx device (or a Tx side) and an Rx device (or an Rx side) should stop communication as well. Moreover, even though perfect SI channel estimation is performed, it is necessary to calibrate a channel of an SI reference path very precisely. The channel of the SI reference path needs to become a lookup table based on the combination of all control voltages. Although an accurate lookup table is written with specific Tx power and temperature, it is supposed to change depending on an original Tx power and a temperature of circuit. Hence, SI signal cancellation performance is inevitably degraded due to a difference between a current Tx power and temperature and a condition at the timing of preparing the lookup table. Moreover, there is a disadvantage that it is unable to follow an SI signal channel (or an SI channel) that changes depending on a time.

Regarding the second method, as a communication device can transmit an SI signal channel estimation signal (tone, pilot signal, reference signal, etc.) carried on both communication band sides without stopping communication and controls an SI reference generator time-continuously using adaptive feedback algorithm, calibration of the SI reference generator is unnecessary. However, as the SI reference generator is controlled using a tone of a guard band on both communication band sides instead of a communication band, it is disadvantageous in that an SI signal attributed to a transmission of a tone inside the communication band, which is most important, is not cancelled.

Figure 17:
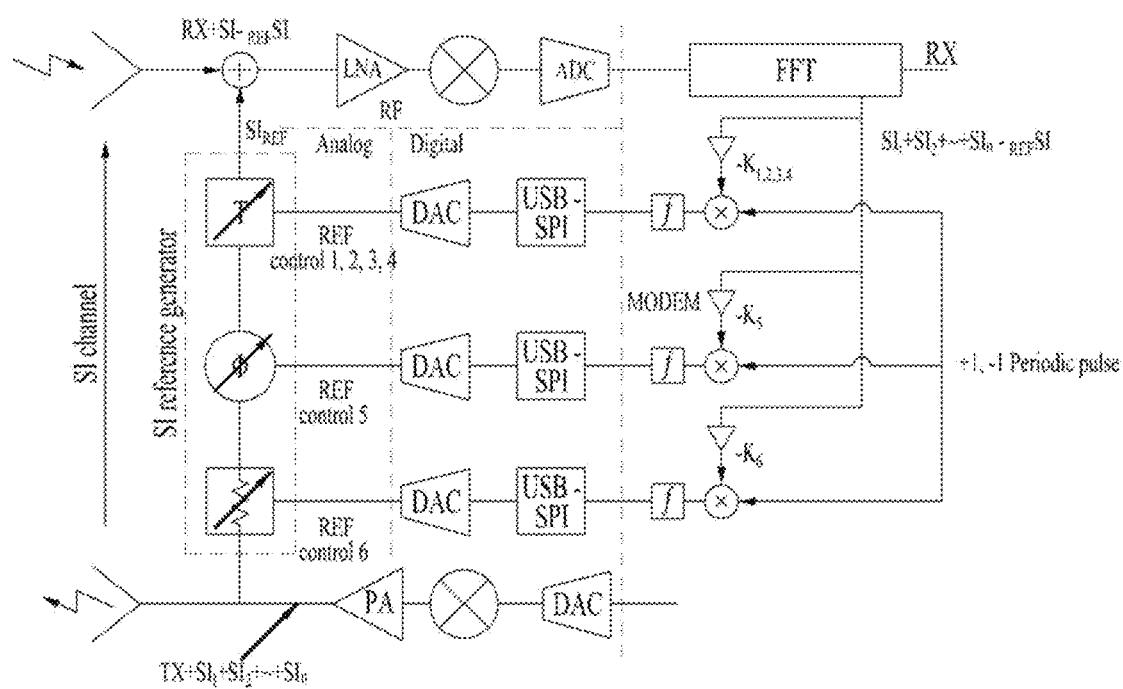
FIG. 17 is a diagram showing one example of an RF chain structure of a communication device for self-interference signal cancellation in using FDR

FIG. 17 is a diagram showing one example of an RF chain structure of a communication device for self-interference signal cancellation in using FDR.

Referring to FIG. 17, an RF chain of a communication device may include a communication modem (or a modem), an SI reference generator, a transmission (Tx) antenna, a reception (Rx) antenna, etc. The communication modem may include a Fast Fourier Transform (FFT) unit and integrators. The SI reference generator may include an attenuator, a phase shifter, and a true time delay circuit.

To generate (or copy) a fine SI reference signal, the SI reference generator may control the attenuator, the phase shifter and the true time delay circuit using an analog manner. To this end, the RF chain may include a Digital to Analog Converter (DAC) configured to convert a control signal transmitted from the communication modem (or modem) into an analog signal.

According to the concept of the true time delay circuit (true time delay) defined as a slope of phase shift to frequency band basically, as it is unable to control a true time delay with information on a single frequency only, it is necessary to obtain information on at least two frequencies in order to perform SI signal cancellation on a wide band. Therefore, it is assumed to transmit two or more pilot signals, two or more reference signals, two or more tones, or the like, which are test signals.

In order to control the SI reference generator, how to use multiple reference signals (or, multiple tones, multiple pilot signals, etc.), which are test signals, is described. First of all, the communication model (or modem) shown in FIG. 15 may monitor a sum of powers of multiple tones at the frequencies where the multiple tones are located as test signals, measure the powers at the frequency positions where the multiple tones are transmitted, respectively, and then calculate the sum of the measured powers. Here, the power measured at the frequency position of the transmitted tone corresponds to the power of the SI signal.

The communication modem may transmit a control signal to minimize a difference between the power sum of SI signals attributed to multiple tones and the power of an SI reference signal. Namely, the communication modem may feed a control signal, which is to minimize the sum of the powers of the SI signals attributed to the multiple tones, back to the SI reference generator. The SI reference generator generates an SI reference signal according to the feedback control signal. To cancel the measured power sum of the SI signals, the communication modem may generate an SI reference signal having a power of a value closest to the power sum.

The communication modem may control the SI reference generator until the power sum (SI=SI1+SI2+SI3+ . . . +SIn) is minimized using the adaptive feedback loop. Here, Sin is a power of an SI signal measured at a frequency position where an nth reference signal among a plurality of reference signals is transmitted. The communication modem uses a periodic pulse signal of +1 and −1 to change a sign of an increment of a bias voltage controlled by a loop function of adaptive feedback. The loop function means a function for searching surroundings of a current variable in a feedback loop including a variable to control.

The communication modem may feed a control signal back to each of the phase shifter, the attenuator and the true time delay circuit using an adaptive feedback loop so as to enable the SI reference generator to generate an SI reference signal having a power closest to a power sum of SI signals.

As a method of controlling SI reference signal generation according to FIG. 17 operates adaptive feedback algorithm with the power sum of multiple tones, it is advantageous in that complicated channel estimation, calibration and the like are unnecessary.

Figure 18:
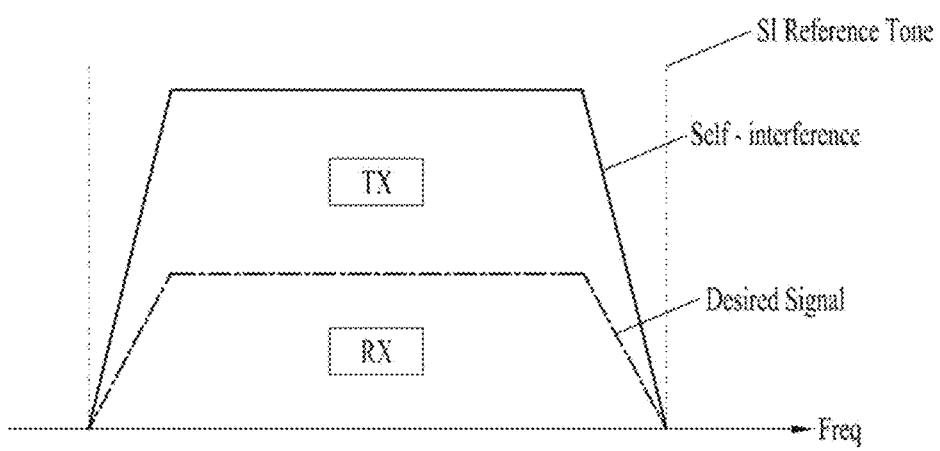
FIG. 18 is a diagram exemplarily showing two tones transmitted on both communication band sides to control a self-interference reference signal generator.

FIG. 18 is a diagram exemplarily showing two tones transmitted on both communication band sides (e.g., guard bands) to control a self-interference (SI) reference signal generator.

Referring to FIG. 18, a SI reference generator may be controlled in such a way that a (guard band) SI signal channel estimation tone is included at both ends of a communication channel band and the corresponding estimation tone is reduced according to an adaptive feedback algorithm. In this case, a desired signal from which self-interference (SI) was removed can be stably received by the system.

On the other hand, the conventional communication system generally uses Received Signal Strength Indicator (RSSI) as a reference value for automatic gain control in a receiver of a wireless communication system. The method for controlling automatic gain based on the RSSI when the SI does not exist can be considered as a reasonable way to maximize performance of the receiver. However, in the case of the full-duplex (FD) wireless transmission communication system, a case where SI power is greater than power of the reception (Rx) signal is frequently generated. In this case, RSSI measured by the receiver becomes identical to self-interference (SI), so that the Rx signal generated after AGC (Automatic Gain Control) is located at a least significant bit (LSB) side of the ADC (Analog-to-Digital Converter) range, resulting in performance deterioration of the receiver. In order to address this issue, a method for performing automatic gain control based on power of the Rx signal measured in the HD section rather than SI power may be considered to be used.

When performing automatic gain control based on the Rx signal, the following cases should be considered.

1. When SI is larger than the Rx signal, if automatic gain control is performed based on the Rx signal, the SI becomes saturated so that clipping may occur.

2. In 5G or pre6G, beamforming should be supported for operation at high frequencies, and 5G or pre6G must respond to a sudden change in SI power generated by the beamforming patterns.

The present disclosure proposes an automatic gain control method for improving performance in a full-duplex radio (FDR) transmission system. Specifically, the present disclosure proposes a method for determining a gain to be applied for such performance improvement.

The FDR transmission system may determine the gain using the ratio of the Rx signal power measured in the HD mode to Tx SI power measured in the FD mode, instead of using the RSSI measured to improve performance of the receiver, thereby obviating the problem in which RSSI measured when Tx SI power is greater than Rx signal power is determined by SI so that the Rx signal becomes smaller. The present disclosure controls the analog gain with the gain determined by the following two steps, thereby preventing occurrence of a problem to be described later and optimizing performance of the receiver.

STEP 1) Method for determining a gain value by referring to a pattern table including transmission power, transmission (Tx) beam, and reception (Rx) beam.

STEP 2) Method for changing a gain based on a difference between Rx signal power of the HD mode receiver and Rx signal power of the FD mode receiver.

Here, the gain is limited so as not to exceed the maximum gain.

At high frequencies mainly used in 5G or pre6G, beamforming for coverage extension is considered as the main technology. When beam switching is performed quickly, it is natural that SI power will also be rapidly changed according to the beam pattern. If the gain of automatic gain control is determined only by the measured signal power, it is impossible for the system to cope with the SI change in such a rapidly changing situation. This situation may adversely affect the process of selecting an appropriate gain, and may thus deteriorate performance of the receiver. Therefore, predicting the SI power to some extent in advance is an essential technique in such beamforming situation. Since the SI power is mainly affected by transmission (Tx) power and the beam pattern, a gain value is determined based on the Tx power and the beam pattern, so that the system can properly cope with the changing SI power in advance, thereby preventing performance of the receiver from being degraded.

Figure 19:
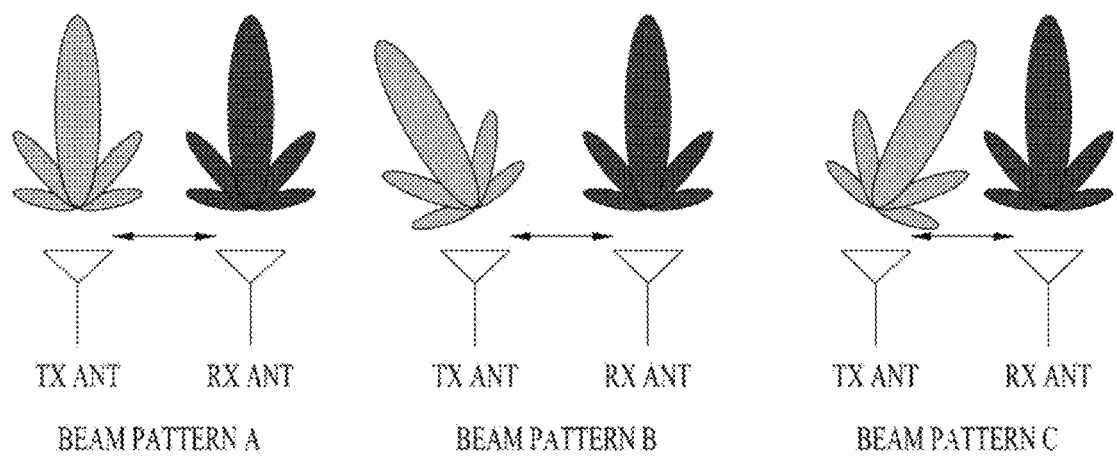
FIG. 19 is a diagram schematically showing a change in self-interference (SI) according to beam patterns applied to the present disclosure.

FIG. 19 is a diagram schematically showing a change in self-interference (SI) according to beam patterns applied to the present disclosure.

Referring to FIG. 19, Beam Pattern (A) may represent a normal situation in which the Rx beam pattern and the Tx beam pattern are located to face the same direction, and each of Beam Pattern (B) and Beam Pattern (C) may represent a situation in which the magnitude of SI changes in response to the change of Tx beam pattern. Beam Pattern (B) may represent a situation in which SI decreases because the Rx beam is located to face the null direction of the Tx beam. Beam Pattern (C) may represent a situation in which the SI increases because the Rx beam is directed toward a larger one among the Tx beams.

An initial FD gain may be determined based on a predetermined Tx power and a predetermined beam pattern. At this time, the initial FD gain is determined to be a value that prevents clipping and minimizes quantization noise.

Table 6 below shows an example of predetermined initial FD gains.

TABLE 6

|  | TX power A | TX power B | TX power C | TX power D |
|---|---|---|---|---|
| Beam pattern A | FD gain aa | FD gain ab | FD gain ac | FD gain ad |
| Beam pattern B | FD gain ba | FD gain bb | FD gain bc | FD gain bd |
| Beam pattern C | FD gain ca | FD gain cb | FD gain cc | FD gain cd |

Thereafter, in order to prevent the Rx signal from being saturated because the FD gain determined by Table 6 is too large, the FD gain is adjusted to be equal to the HD gain when the FD gain is higher than the HD gain.

After the FD gain is determined by referring to Table 6, the FD gain is changed in response to the ratio of FD Rx signal power to HD Rx signal power, so that performance of the receiver can be optimized. To this end, the Rx signal power in the HD section and the Rx signal power in the FD section are measured. If the FD Rx signal power is lower than the HD Rx signal power, the FD gain may increase by the HD Rx signal power. If the FD Rx signal power is greater than the HD Rx signal power, the FD gain may decrease to be optimized. At this time, the gain is controlled not to exceed the maximum gain, and the maximum gain is determined by the following parameters.

SI power
ADC range
PAPR (Peak-to-Average Power Ratio)
Channel condition (Fading, etc.)

Figure 20:
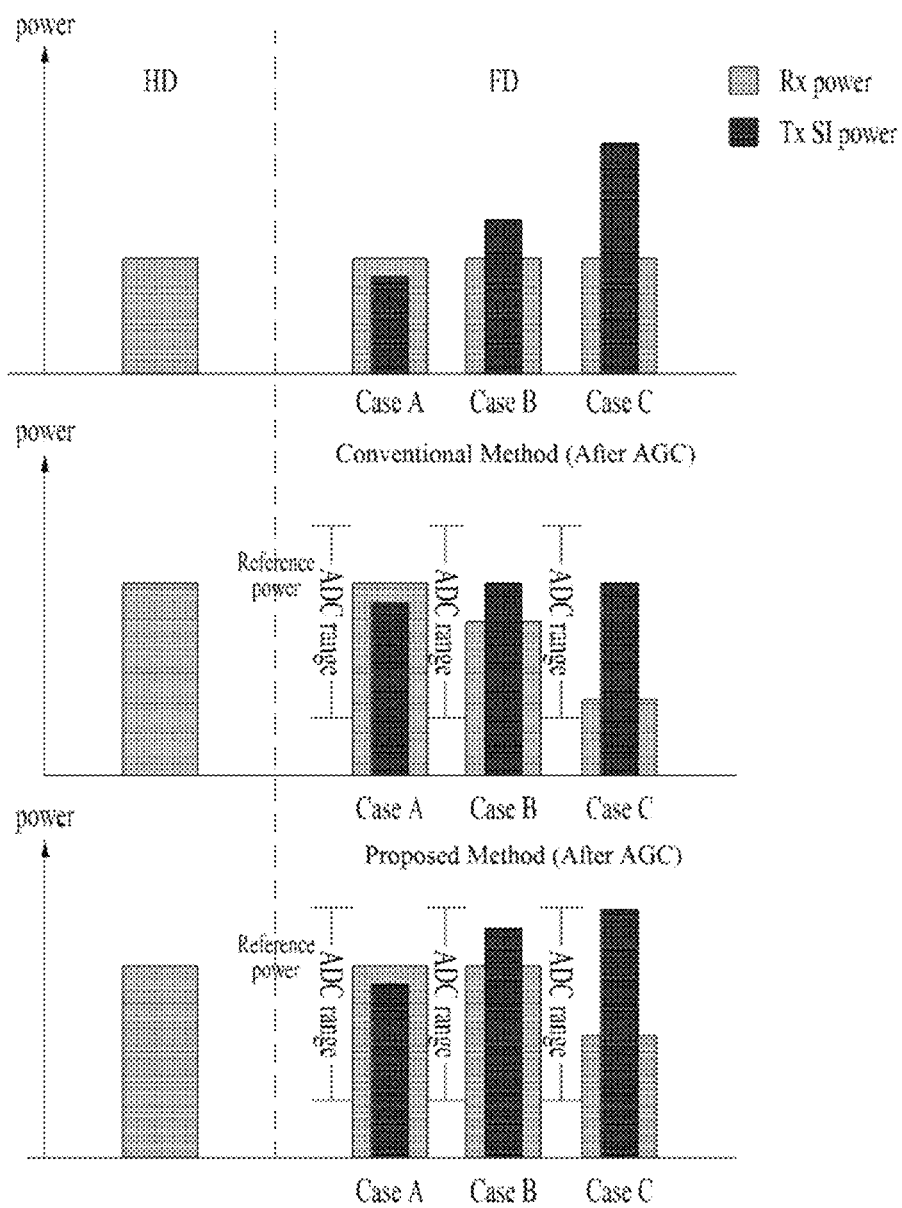
FIG. 20 is a diagram schematically showing transmission (Tx) SI power and reception (Rx) power for each case according to the present disclosure.

FIG. 20 is a diagram schematically showing transmission (Tx) SI power and reception (Rx) power for each case according to the present disclosure.

Referring to FIG. 20, Case A may represent a case in which Rx power is greater than Tx SI power, and each of Case B and Case C may represent a case in which Tx SI power is greater than Rx power.

According to the conventional method of determining reference signal (RS) power with the measured RSSI, Case A has no problems, and each of Case B and Case C may represent a situation in which power of the Rx signal is lowered.

In contrast, according to the present disclosure, Case B and Case C are designed to increase the gain, thereby guaranteeing performance of the Rx signal.

Case B may represent a situation in which the gain increases until the FD Rx signal power is adjusted to be equal to the HD Rx signal power.

Case C may represent a situation in which Tx SI power is significantly greater than RX power. In this case, in order to prevent clipping generated when Tx SI power is saturated, a maximum gain value may be preset such that the gain value can be limited.

Figure 21:
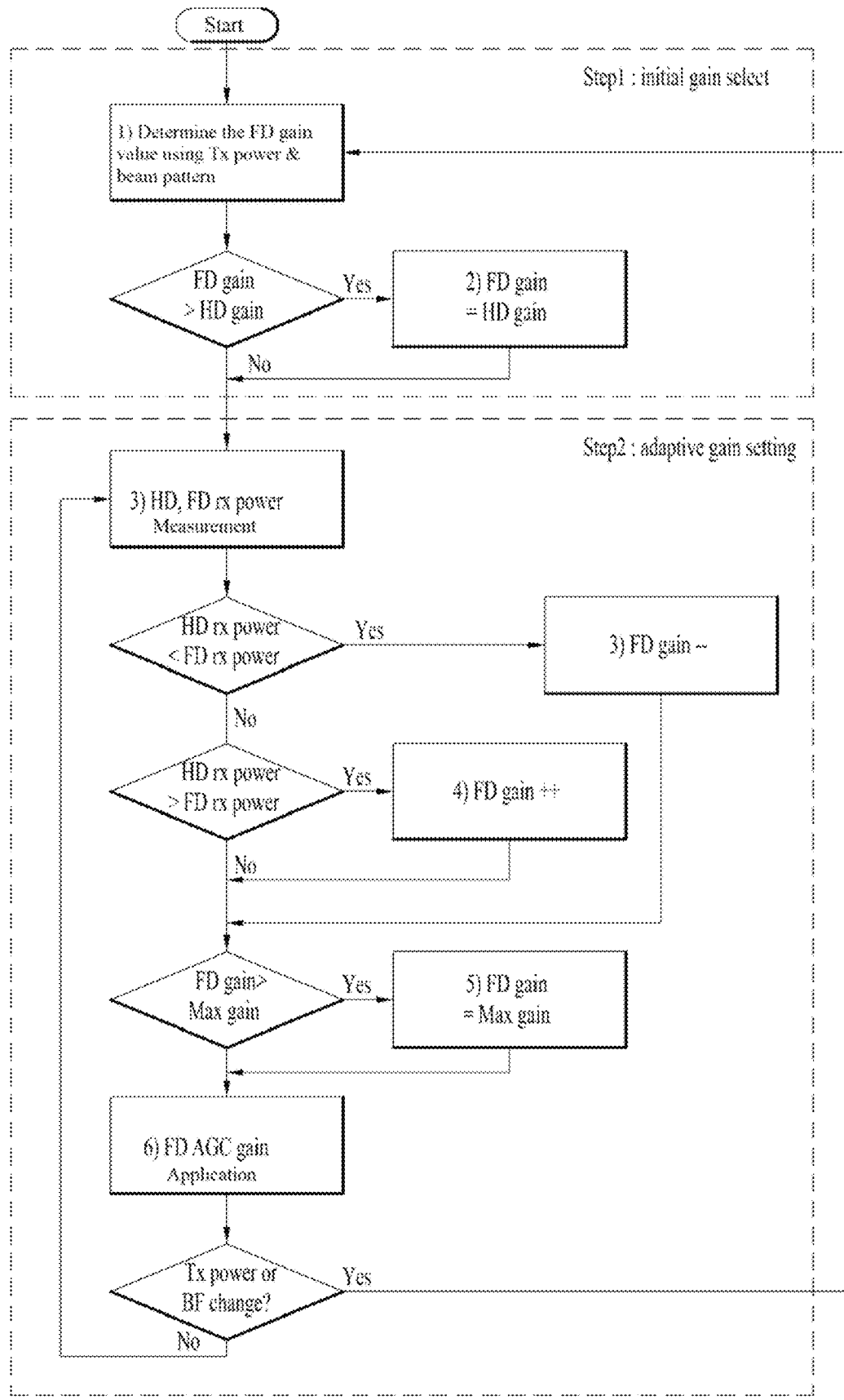
FIG. 21 is a flowchart illustrating a method for performing automatic gain control applied to the present disclosure.

FIG. 21 is a flowchart illustrating a method for performing automatic gain control applied to the present disclosure.

The entire process of controlling the gain is shown in FIG. 21, and this gain control method will hereinafter be described as follows.

1) The FD gain initial value is changed according to transmission (Tx) power and the beam pattern. When the Tx power and the beam pattern are changed, the FD gain initial value can be restarted from '1'.

2) When the FD gain is higher than the HD gain (when the Tx SI power is lower than the Rx power), the Rx signal can be saturated so that the FD gain is matched with the HD gain.

3) After the initial FD gain is applied, the Rx signal power in the HD section is measured, and the Rx signal power in the FD section is measured.

4) When the FD Rx signal power is greater than the HD signal power, the FD gain is reduced.

5) When the FD Rx signal power is lower than the HD Rx signal power, the FD gain is increased.

6) The FD AGC gain is compared with the maximum gain (max gain). If the FD gain is higher than the maximum gain, a gain value is changed to the maximum gain.

7) After the determined gain is applied, the process returns to the second step, and steps from the second step can be repeatedly performed.

As a result of the actual experiment by implementing the method proposed in the present disclosure, the following performance improvement can be implemented.

Test Case
■ RX power: −60 dBm
■ Tx power: −10 dBm
♦ RF-SIC out (SI power): −40 dBm

- MCS 64QAM
- Max Throughput: 23 Mbps

Performance Before Applying the Technique
- SNR: 11.4 dB
- BLER: 77.3%
- Throughput: 4.9 Mbps Performance after Applying the Technique
- SNR: 12.6 dB
- BLER: 38.5%
- Throughput: 13.24 Mbps Test Result
- Throughput increases by about 3 times, and BLER decreases by half.

This patent document proposes the following method according to various embodiments.

1) Analog gain control technique in the full-duplex radio (FDR) system
2) Gain selection by Tx power & Beam Pattern in the FDR system
3) Gain adaptive algorithm application technique according to a channel change in the FDR system According to this patent document, a method for performing gain control using another method rather than the RSSI-based method in the FDR system is proposed, so that performance of the FDR system can be improved.

Hereinafter, devices for performing the above-described proposed methods will be described in detail.

Communication System Example to which the Present Disclosure is Applied

Although not limited thereto, various descriptions, functions, procedures, proposals, methods, and/or operational flow charts of the present disclosure disclosed in this document can be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 22:
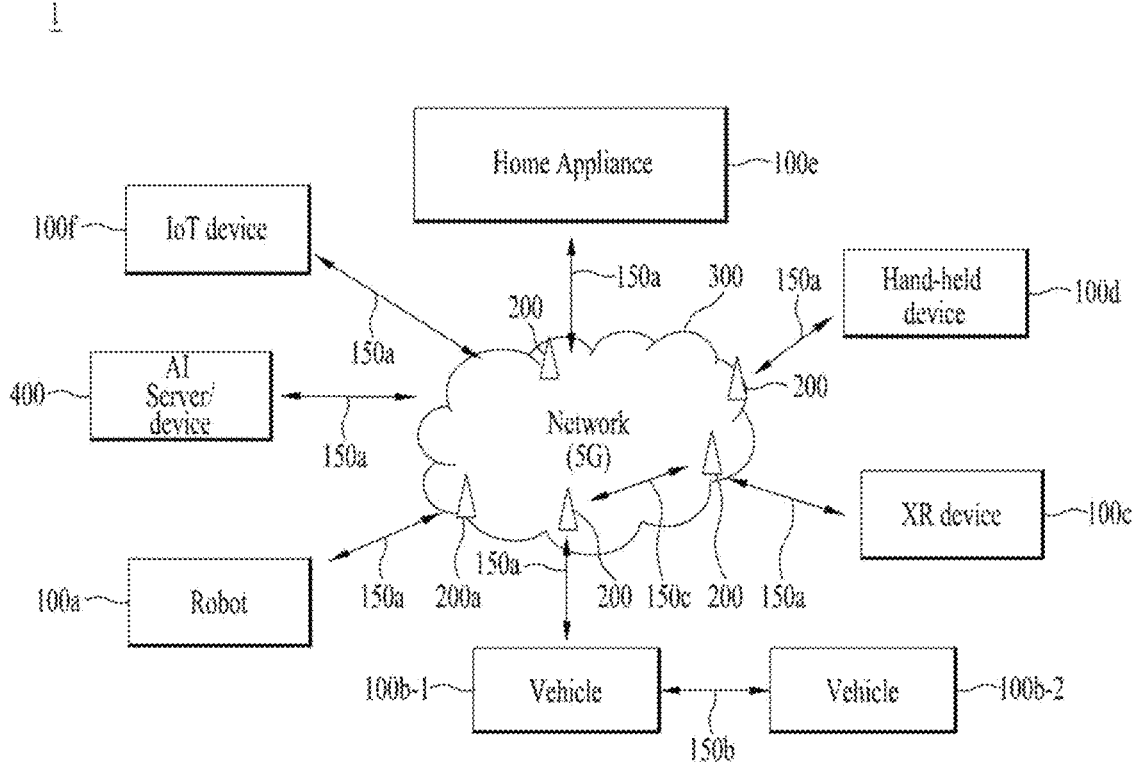
FIG. 22 illustrates a communication system applied to the present disclosure.

FIG. 22 illustrates a communication system applied to the present disclosure.

Referring to FIG. 22, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 23:
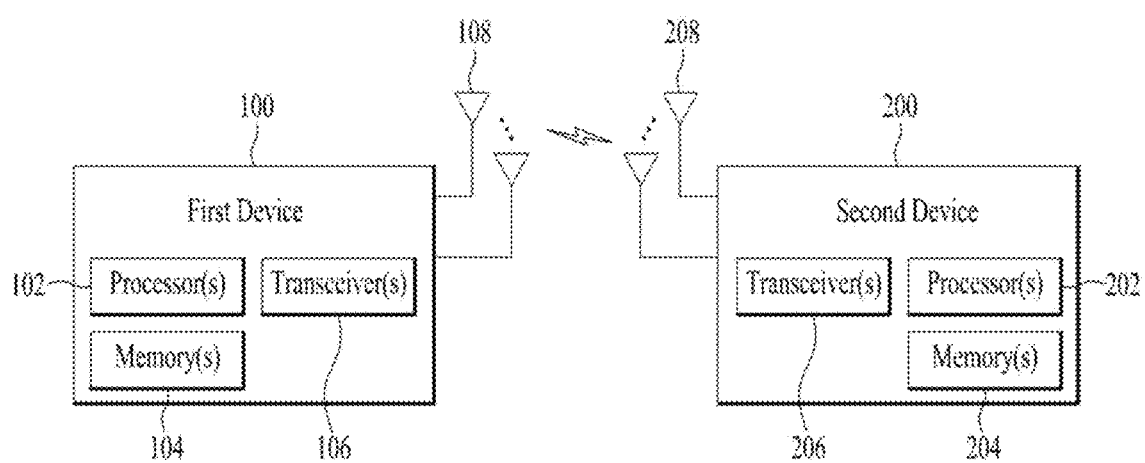
FIG. 23 illustrates wireless devices applicable to the present disclosure.

FIG. 23 illustrates a wireless device applicable to the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the chipset may include the processor(s) 102 and memory(s) 104. The memory(s) 104 may include at least one program capable of performing operations related to the embodiments above described. The processor(s) 102 may receive allocation of resources related to FDR based on the at least one program stored in the memory(s) 104.

The processor(s) 102 may control the RF transceiver(s) to report SIC capability to a BS. The processor(s) 102 may control the RF transceiver(s) to receive resource allocation information on a predetermined time period divided into a first time resource period and a second time resource period from the BS. In this case, the first time resource period may be a time resource period allocated to simultaneously perform transmission of a UL signal and reception of a DL signal in the same frequency band, and the second time resource period may be a time resource period allocated to perform either the transmission of the UL signal or the reception of the DL signal. In addition, the first time resource period and the second time resource period may be determined based on the SIC capability, the amount of first data related to the UL signal, and the amount of second data related to the DL signal.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor(s) 202 of a BS may control the RF transceiver(s) to receive a report on SIC capability related to FDR from a UE. The processor(s) 202 may determine a first time resource period in which transmission of a UL signal and reception of a DL signal are simultaneously performed in the same frequency band for a predetermined time period and a second time resource period in which either the transmission of the UL signal or the reception of the DL signal is performed. The processor(s) 202 may control the RF transceiver(s) to transmit resource allocation information including information on the first time resource period and the second time resource period to the UE.

In another aspect of the present disclosure, there is provided a computer-readable storage medium having at least one computer program configured to cause at least one processor to perform operations. The operations may include: providing information on SIC capability to a BS; and receiving resource allocation information on a predetermined time period divided into a first time resource period and a second time resource period from the BS. In this case, the first time resource period may be a time resource period allocated to simultaneously perform transmission of a UL signal and reception of a DL signal in the same frequency band, and the second time resource period is a time resource period allocated to perform either the transmission of the UL signal or the reception of the DL signal. In addition, the first time resource period and the second time resource period may be determined based on the SIC capability, the amount of first data related to the UL signal, and the amount of second data related to the DL signal.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 24:
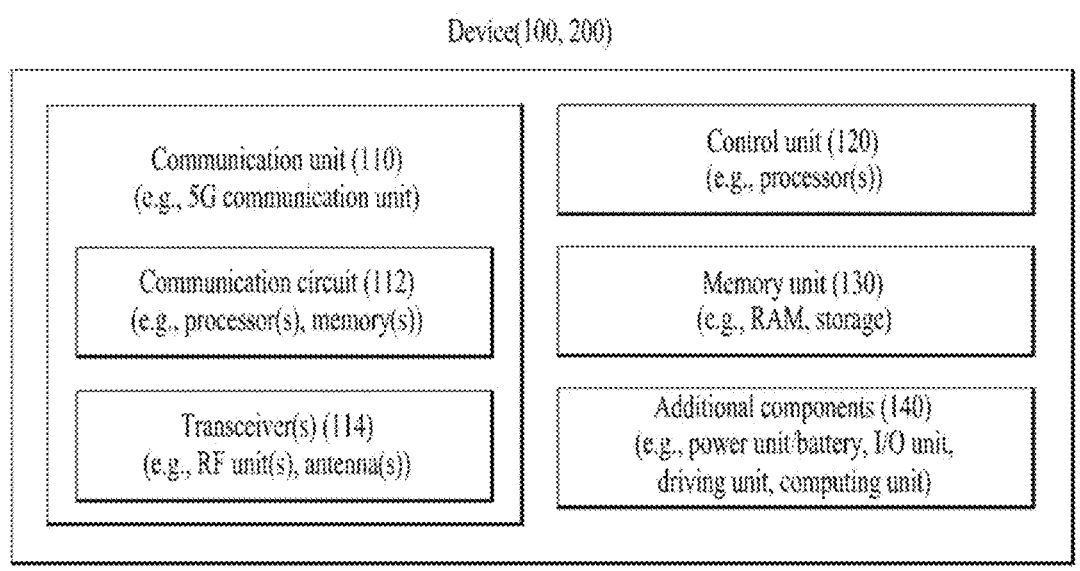
FIG. 24 illustrates another example of a wireless device to which the present disclosure is applied. The wireless device may be implemented in various forms according to use-examples/services.

FIG. 24 illustrates another example of a wireless device applied to the present disclosure. The wireless device may be implemented in various forms according to a use-case/service (refer to FIG. 22)

Referring to FIG. 24, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Examples of Mobile Devices to which the Present Disclosure is Applied

Figure 25:
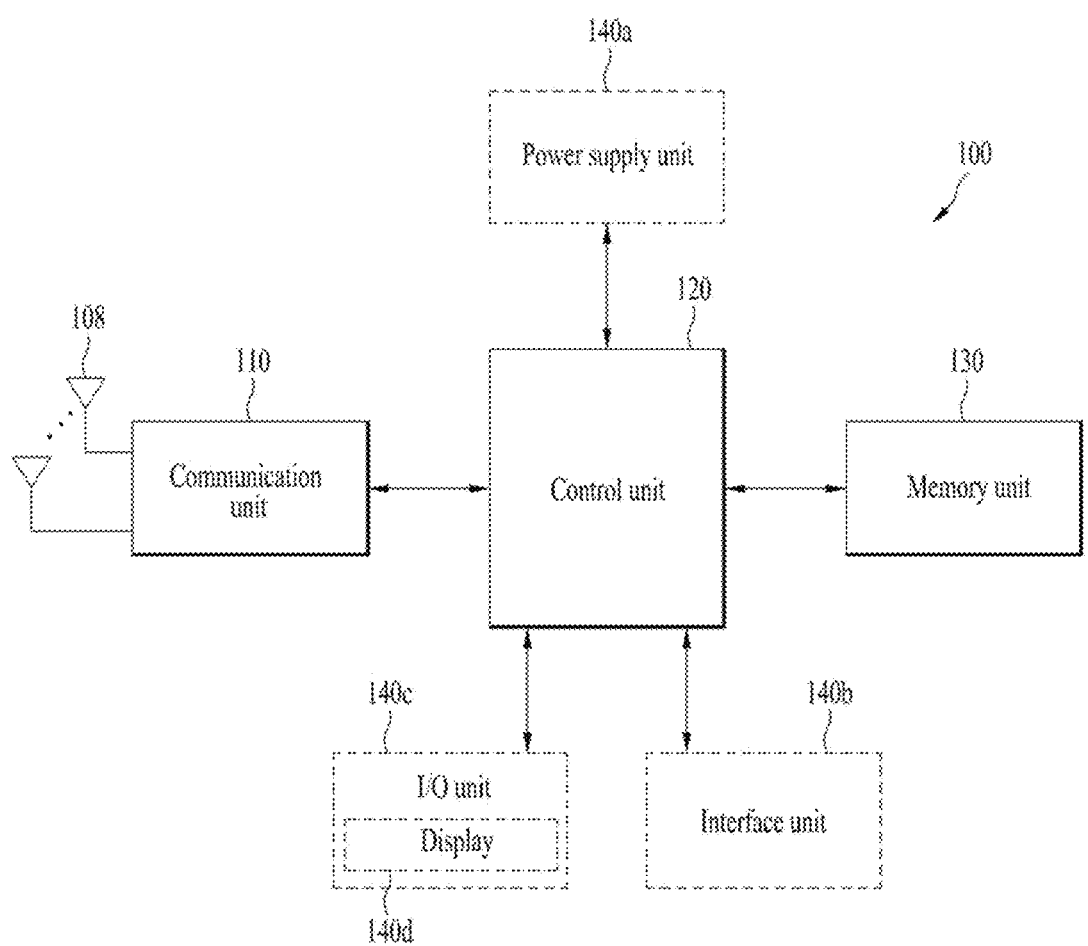
FIG. 25 illustrates a hand-held device applied to the present disclosure.

FIG. 25 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 26:
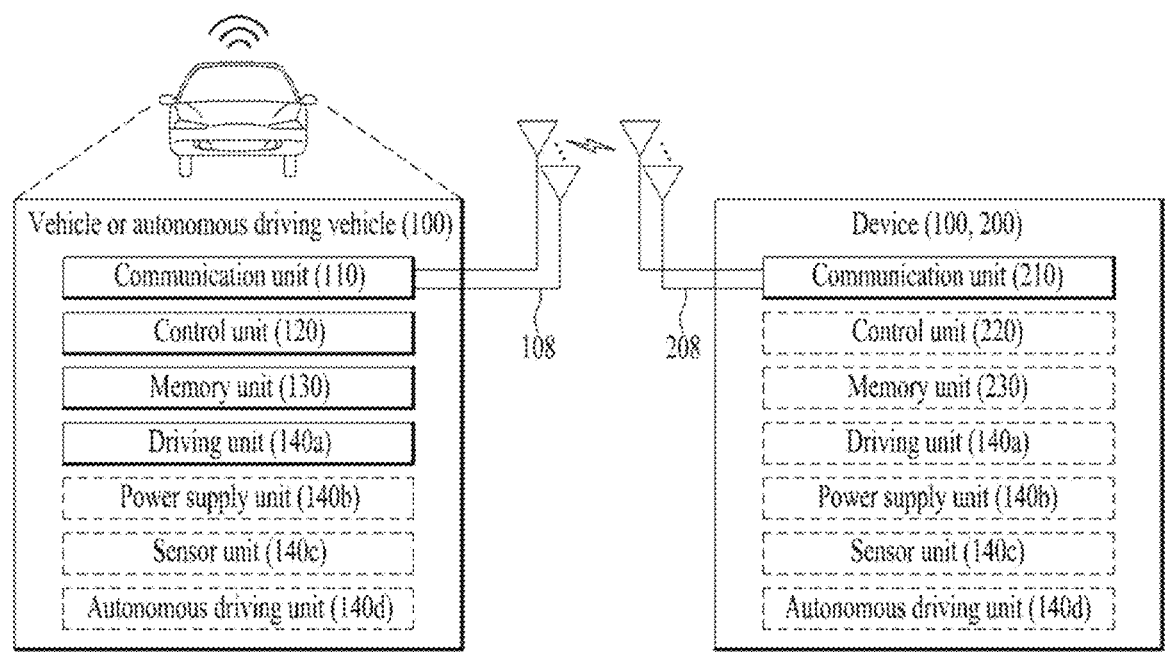
FIG. 26 illustrates a vehicle or an autonomous driving vehicle applied to the present disclosure.

Examples of Vehicles or Autonomous Vehicles to which the Present Disclosure is Applied FIG. 26 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method for transmitting and receiving signals by a user equipment (UE) in a wireless communication system comprising:
receiving a first reference signal from a base station (BS);
receiving a second reference signal from the base station (BS);
measuring power of the received first reference signal and power of the received second reference signal, respectively; and
comparing a magnitude of the measured power of the first reference signal with a magnitude of the measured power of the second reference signal,
wherein the first reference signal is received in a half-duplex (HD) transmission mode, the second reference signal is received in a full-duplex (FD) transmission mode, and a full-duplex (FD) gain value of the FD transmission mode is changed based on a result of the comparison.

2. The method according to claim 1, wherein:
an initial value of the FD gain value is configured based on transmission (Tx) power, a transmission (Tx) beam pattern, and a reception (Rx) beam pattern.

3. The method according to claim 2, wherein:
based on a case in which an initial value of the configured FD gain value is higher than a half-duplex (HD) gain value indicating a gain value of the HD transmission mode,
the FD gain value is changed to the HD gain value.

4. The method according to claim 2, further comprising:
after the initial value of the FD gain value is completely configured, measuring power of the received first reference signal and power of the received second reference signal, respectively.

5. The method according to claim 1, further comprising:
based on a case in which the power of the second reference signal is greater than the power of the first reference signal, reducing the FD gain value; and
based on a case in which the power of the second reference signal is lower than the power of the first reference signal, increasing the FD gain value.

6. The method according to claim 4, wherein:
reducing or increasing the FD gain value is implemented by reducing or increasing the FD gain value until the power of the second reference signal becomes equal to the power of the first reference signal.

7. The method according to claim 1, further comprising:
based on a case in which the FD gain value is higher than a predetermined maximum gain value, changing the FD gain value to the predetermined maximum gain value.

8. The method according to claim 7, wherein:
the predetermined maximum gain value is determined based on at least one of self-interference power, an analog-to-digital conversion (ADC) range, a peak-to-average power ratio (PAPR), and a channel state.

9. A user equipment (UE) for transmitting and receiving signals in a wireless communication system comprising:
a transceiver; and
a processor,
wherein
the transceiver is configured to receive a first reference signal and a second reference signal from a base station (BS); and
the processor is configured to measure power of the received first reference signal and power of the received second reference signal, respectively, and to compare a magnitude of the measured power of the first reference signal with a magnitude of the measured power of the second reference signal,
wherein the first reference signal is received in a half-duplex (HD) transmission mode, the second reference signal is received in a full-duplex (FD) transmission mode, and a full-duplex (FD) gain value of the FD transmission mode is changed based on a result of the comparison.

10. A base station (BS) for transmitting and receiving signals in a wireless communication system comprising:
a transceiver; and
a processor,
wherein
the transceiver is configured to receive a first reference signal and a second reference signal; and
the processor is configured to measure power of the received first reference signal and power of the received second reference signal, respectively, and to compare a magnitude of the measured power of the first reference signal with a magnitude of the measured power of the second reference signal,
wherein the first reference signal is received in a half-duplex (HD) transmission mode, the second reference signal is received in a full-duplex (FD) transmission mode, and a full-duplex (FD) gain value of the FD transmission mode is changed based on a result of the comparison.

11. The BS according to claim 10, wherein:
an initial value of the FD gain value is configured based on transmission (Tx) power, a transmission (Tx) beam pattern, and a reception (Rx) beam pattern.

12. The BS according to claim 11, wherein:
based on a case in which an initial value of the configured FD gain value is higher than a half-duplex (HD) gain value indicating a gain value of the HD transmission mode,
the FD gain value is changed to the HD gain value.

* * * * *